(12) United States Patent
Chen et al.

(10) Patent No.: US 9,748,058 B2
(45) Date of Patent: Aug. 29, 2017

(54) KEY STRUCTURE AND PORTABLE COMPUTER USING THE SAME

(71) Applicant: LITE-ON TECHNOLOGY CORPORATION, Taipei (TW)

(72) Inventors: Chun-Lin Chen, Taipei (TW); Chih-Jen Kuo, Taipei (TW); Ming-Fu Yen, Taipei (TW); Kuo-Hui Hsu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/049,001

(22) Filed: Feb. 19, 2016

(65) Prior Publication Data

US 2016/0329174 A1 Nov. 10, 2016

Related U.S. Application Data

(60) Provisional application No. 62/158,526, filed on May 7, 2015.

(30) Foreign Application Priority Data

Oct. 15, 2015 (TW) .............................. 104133859 A

(51) Int. Cl.
*H01H 13/84* (2006.01)
*H01H 3/12* (2006.01)
*G06F 1/16* (2006.01)

(52) U.S. Cl.
CPC ........... *H01H 13/84* (2013.01); *G06F 1/1616* (2013.01); *G06F 1/1662* (2013.01);
(Continued)

(58) Field of Classification Search
CPC ... H01H 13/84; H01H 2221/04; G06F 1/1616
(Continued)

(56) References Cited

U.S. PATENT DOCUMENTS 4,977,298 A * 12/1990 Fujiyama ............. H01H 13/702
200/5 A
5,382,762 A   1/1995 Mochizuki
(Continued)

FOREIGN PATENT DOCUMENTS

| CN | 1145687 A | 3/1997 |
| TW | 201434064 A | 9/2014 |
| TW | 201515040 A | 4/2015 |

OTHER PUBLICATIONS

U.S. Office Action dated Jun. 16, 2017 corresponding to U.S. Appl. No. 15/232,272.
(Continued)

*Primary Examiner* — Edwin A. Leon
*Assistant Examiner* — Iman Malakooti
(74) *Attorney, Agent, or Firm* — Rabin & Berdo, P.C.

(57) ABSTRACT

A key structure includes a key cap, a bridge assembly, a first supporting part, a second supporting part, an attractable element and a magnet. The bridge assembly includes first and second hinge parts. One end of the first hinge part has a first link bar, and the other end has a first pivot coupling portion and a first shaft having a first connecting portion. One end of the second hinge part has a second link bar, and the other end has a second pivot coupling portion and a second shaft having a second connecting portion coupled to the first connecting portion. When the magnet under a first attractive position, the first end of the attractable element is attracted to the first attractive position. When the magnet under a second attractive position, the second end of the attractable element is attracted to the second attractive position.

27 Claims, 20 Drawing Sheets

(52) U.S. Cl.
CPC ........... G06F 1/1681 (2013.01); H01H 3/122 (2013.01); H01H 3/125 (2013.01); *H01H 2221/04* (2013.01)

(58) Field of Classification Search
USPC ................................................ 200/5 A, 341
See application file for complete search history.

(56) References Cited

U.S. PATENT DOCUMENTS

| | | | |
|---|---|---|---|
| 5,977,888 A * | 11/1999 | Fujita | H01H 13/705 200/12 |
| 6,172,868 B1 | 1/2001 | Oura | |
| 7,022,927 B2 | 4/2006 | Hsu | |
| 7,417,200 B2 | 8/2008 | Hsu | |
| 7,449,651 B2 | 11/2008 | Lin | |
| 2009/0283393 A1 | 11/2009 | Chen et al. | |
| 2014/0231234 A1* | 8/2014 | Hsu | H01H 13/52 200/5 A |
| 2015/0101916 A1 | 4/2015 | Chen | |
| 2015/0101917 A1* | 4/2015 | Yen | H01H 13/84 200/5 A |

OTHER PUBLICATIONS

U.S. Office Action dated Jun. 23, 2017 corresponding to U.S. Appl. No. 15/618,602.
Taiwanese Office Action dated May 4, 2017.

\* cited by examiner

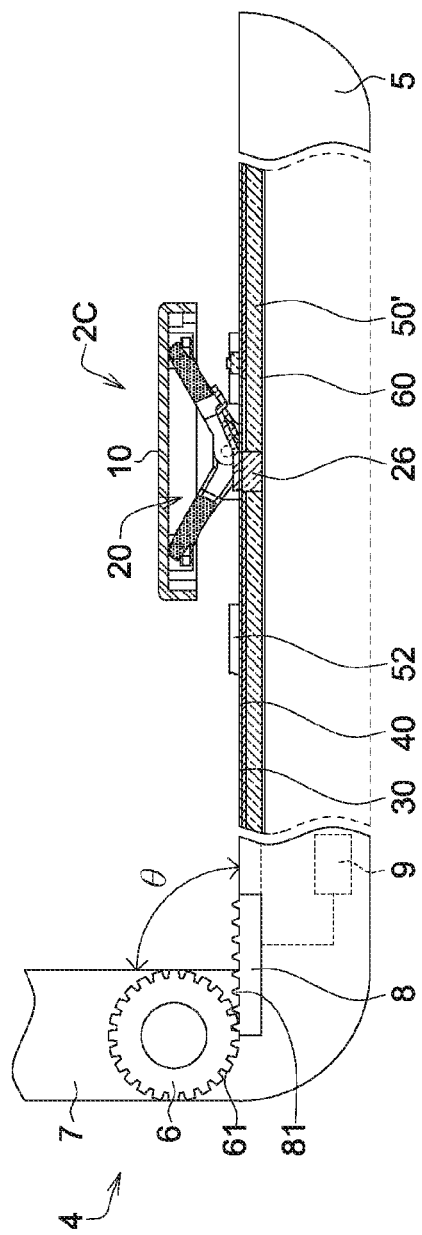
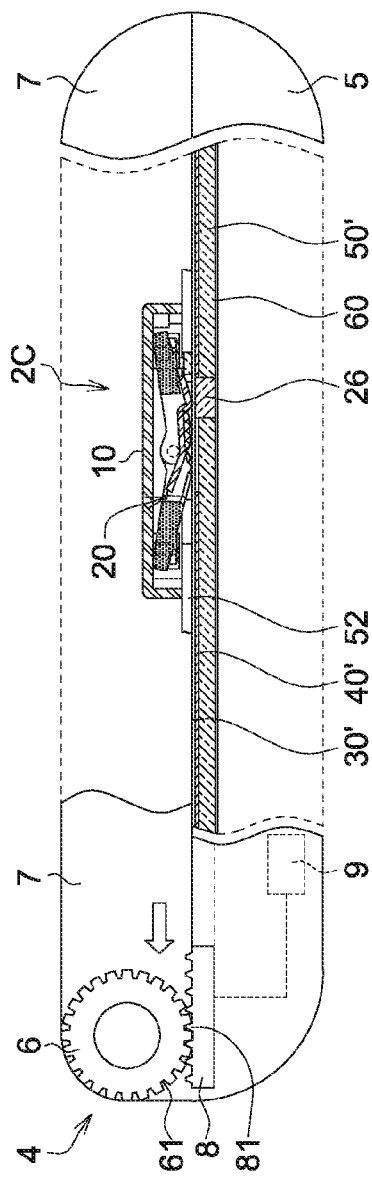
FIG. 12A
FIG. 12B

KEY STRUCTURE AND PORTABLE COMPUTER USING THE SAME

This application claims the benefits of U.S. provisional application Ser. No. 62/158,526, filed May 7, 2015 and Taiwan application Serial No. 104133859, filed Oct. 15, 2015, the subject matters of which are incorporated herein by references.

BACKGROUND OF THE INVENTION

Field of the Invention

The invention relates in general to a key structure, and more particularly to a key structure with lightweight and thinning design and a portable computer using the same.

Description of the Related Art

In a conventional key structure, an elastic member provides a recovery elastic force for a key cap supported by a scissor structure to restore the key cap to its pre-pressing position. However, the scissor structure, being hard to assemble and having a longer pressing stroke, is not suitable to the keyboard with thinning design. Meanwhile, when the key cap is pressed, the downward force is transmitted to a thin film circuit board formed of bi-layer circuits by the elastic member. However, if the downward force is insufficient, it is difficult to make the bi-layer circuits come into contact, and the sensitivity will be poor. Besides, the key structure cannot be stored to reduce the structural height when the key structure is not in use. Under the current trend of ultra-thinning design of the portable computer, there is a strong need to develop a new key structure whose overall height is reduced when the portable computer is closed.

SUMMARY OF THE INVENTION

The invention is directed to a key structure with lightweight and thinning design and a portable computer using the same capable of shortening the pressing stroke and increasing the sensitivity.

The invention is directed to a key structure capable of reducing the overall height of the key structure by changing the key structure to a storing status from a releasing status.

The invention is directed to a portable computer using a key structure whose overall height is reduced at a storing status when the portable computer is closed.

According to one embodiment of the present invention, a key structure including a key cap, a bridge assembly, a first supporting part, a second supporting part, an attractable element and a magnet is provided. The bridge assembly is disposed under the key cap. The bridge assembly includes a first hinge part and a second hinge part. One end of the first hinge part has a first link bar, the other end of the first hinge part has a first pivot coupling portion and a first shaft, and the first shaft has a first connecting portion. One end of the second hinge part has a second link bar, and the other end of the second hinge part has a second pivot coupling portion and a second shaft. The second shaft has a second connecting portion. The first connecting portion and the second connecting portions are coupled to each other, so that the first hinge part and the second hinge part are connected. The first and second supporting parts are coupled to two ends of the first pivot coupling portion and two ends of the second pivot coupling portion, respectively. The attractable element is disposed under the bridge assembly, and has a first end and a second end. The first end or the second end are rotated around an axis and correspondingly moved to a first attractive position or a second attractive position, respectively. The magnet provides a magnetic force and is movable between the underneath of the first and second attractive positions. When the magnet is under the first attractive position, the first end of the attractable element is attracted by the magnetic force and moved to the first attractive position. When the magnet is under the second attractive position, the second end of the attractable element is attracted by the magnetic force and moved to the second attractive position.

According to another embodiment of the present invention, a portable computer including an upper cover, a lower cover and a connecting part is provided. The upper cover and the lower cover are connected to the connecting part. The connecting part is coupled to a base board or a supporting board of the key structure through a connecting assembly to change the key structure to a storing status or a releasing status.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 3-1 is a schematic diagram of a base board with a magnet.

FIGS. 3-2-3-4 are schematic diagrams of a supporting board and relative sliding between the supporting board and the base board of FIG. 3-1.

FIG. 3-5 shows a schematic diagram of a lower casing used for positioning the base board.

FIGS. 3-6-3-8 are schematic diagrams of relative sliding between the base board and the lower casing of FIG. 3-5.

FIG. 4 is a schematic diagram of a key structure after assembly according to an embodiment of the invention.

FIG. 8 is a decomposition diagram of a key structure before assembly according to another embodiment of the invention.

FIGS. 12A and 12B are cross-sectional views of the key structure of the invention disposed in a portable computer and changed to a storing status (when the upper cover and the body of the portable computer are closed) from a releasing status (that is, a serviceable status, when the upper cover of the portable computer is opened).

FIGS. 13-1-13-4 are assembly diagrams of connecting assemblies disposed in a portable computer according to four embodiments of the invention.

FIG. 13-5 is a schematic diagram of a connecting assembly used in the portable computer of FIGS. 13-1-13-2.

FIG. 13-6 is a schematic diagram of a connecting assembly used in the portable computer of FIGS. 13-3-13-4.

FIG. 13-7 is a schematic diagram of a cam pillar with guide members sliding along a recess on the cam pillar.

FIGS. 14A-140 are cross-sectional views of a key structure with a backlight module according to three embodiments of the invention.

FIGS. 16-1 and 16-2 are cross-sectional views of a light-emitting key structure with illumination function according to an embodiment of the invention.

DETAILED DESCRIPTION OF THE INVENTION

A number of embodiments are disclosed below for elaborating the invention. However, the embodiments of the invention are for detailed descriptions only, not for limiting the scope of protection of the invention.

Figure 1:
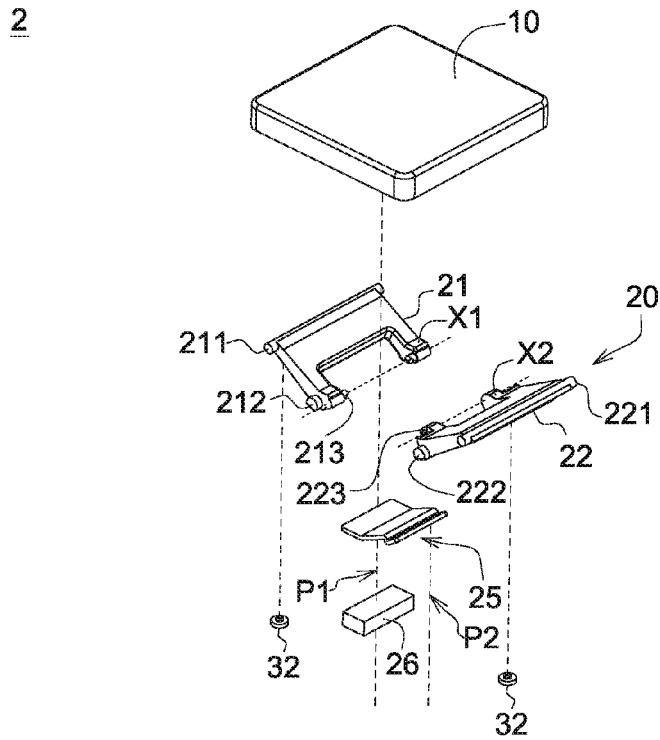
FIGS. 1-2 respective are a top-view decomposition diagram and a bottom-view decomposition diagram of a key structure according to an embodiment of the invention.
Figure 2:
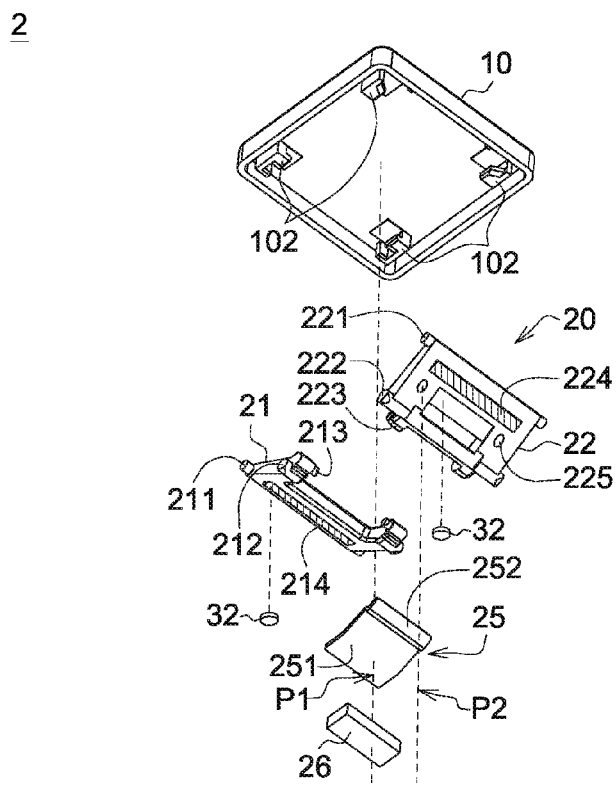

FIGS. 1-2 respective are a top-view decomposition diagram and a bottom-view decomposition diagram of a key structure 2 according to an embodiment of the invention. Refer to FIG. 1. The key structure 2 includes a key cap 10 and a bridge assembly 20. The bridge assembly 20 is disposed under the key cap 10. The bridge assembly 20 includes a first hinge part 21 and a second hinge part 22 intersecting to form a V-shaped structure. One end of the first hinge part 21 has a first link bar 211, and the other end of the first hinge part 21 has a first pivot coupling portion 212 and a first shaft X1. One end of the second hinge part 22 has a second link bar 221, and the other end of the second hinge part 22 has a second pivot coupling portion 222 and a second shaft X2. Additionally, the first shaft X1 of the first hinge part 21 has a first connecting portion 213, and the second shaft X2 of the second hinge part 22 has a second connecting portion 223. The first connecting portion 213 and the second connecting portion 223 are coupled to each other through such as a protrusion portion and an indention portion on an axis A1 (refer to FIG. 4, FIG. 6A and FIG. 6B), so that the first shaft X1 of the first hinge part 21 and the second shaft X2 of the second hinge part 22 are on the same axis.

As indicated in FIG. 1, the key structure 2 further includes an attractable element 25 and a magnet 26. The attractable element 25 is disposed under the bridge assembly. In an embodiment, the attractable element 25 can be fixed under the bridge assembly through an engaging structure. In another embodiment, the bridge assembly 20 is made by using an in-mold injection method. First, the attractable element 25 is disposed inside a mold, and then plastics is heated and injected into the mold to form the first hinge part 21 and the second hinge part 22 of the bridge assembly 20, so that the first hinge part 21 or the second hinge part 22 formed by way of injection can be integrally formed in one piece with the attractable element 25 disposed inside the mold. The attractable element 25 and the magnet 26 can be deemed as a magnetic assembly. The magnet 26 is preferably made of permanent magnetic materials, which includes hard ferrites magnet and rare-earth Nd—Fe—B Magnet. Hard ferrites magnet is made of Sro, or Bao and Fe2O3 by ceramic manufacturing technology. Rare-earth Nd—Fe—B Magnet is mainly made of neodymium (Nd), iron (Fe), and boron (B) by method of metal melting and powder metallurgy, to be sintered with Al—Ni—Co, samarium (Sm)—Ni—Co, Sm—Co.

Figure 6A:
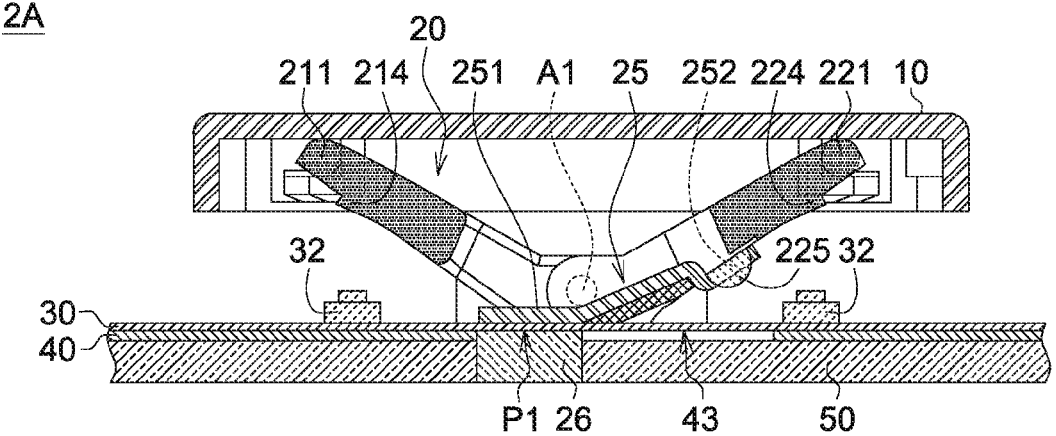
FIGS. 6A and 6B are cross-sectional views of a key structure along an A-A cross-sectional line of FIG. 5A when the key structure is pressed to change to a pressing status from a releasing status.
Figure 6B:
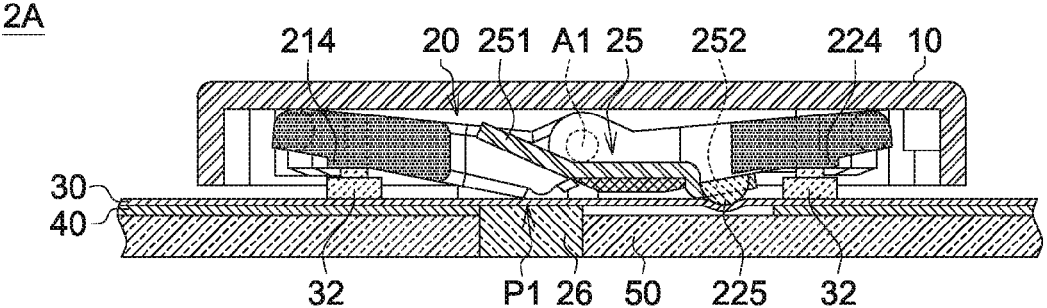
Figure 7A:
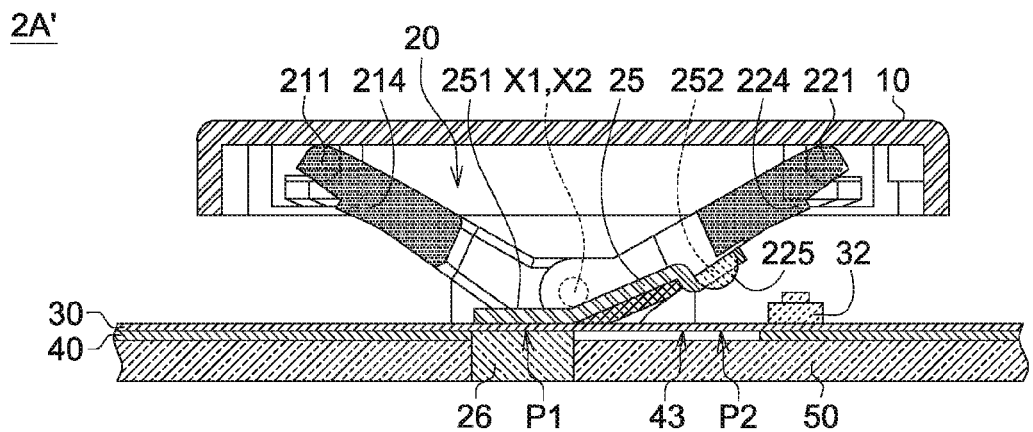
FIGS. 7A and 7B are cross-sectional views of the key structure along an A-A cross-sectional line of FIG. 5B when the key structure is changed to a storing status from a releasing status.
Figure 7B:
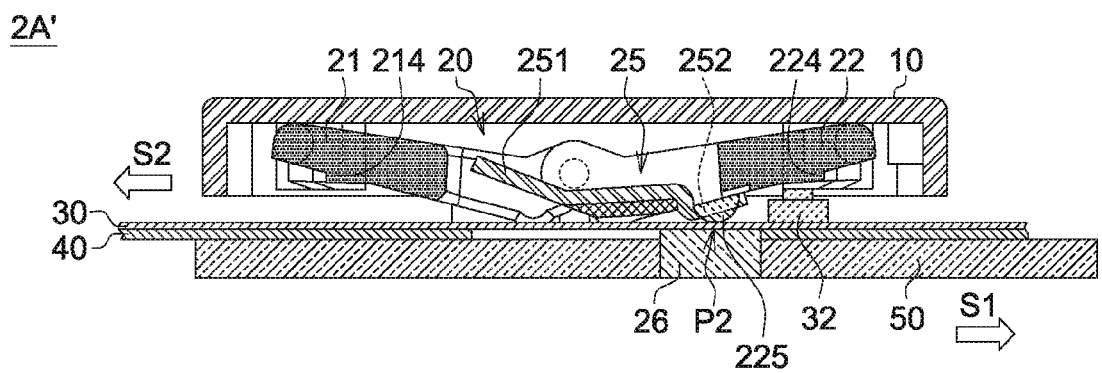
Figure 8:
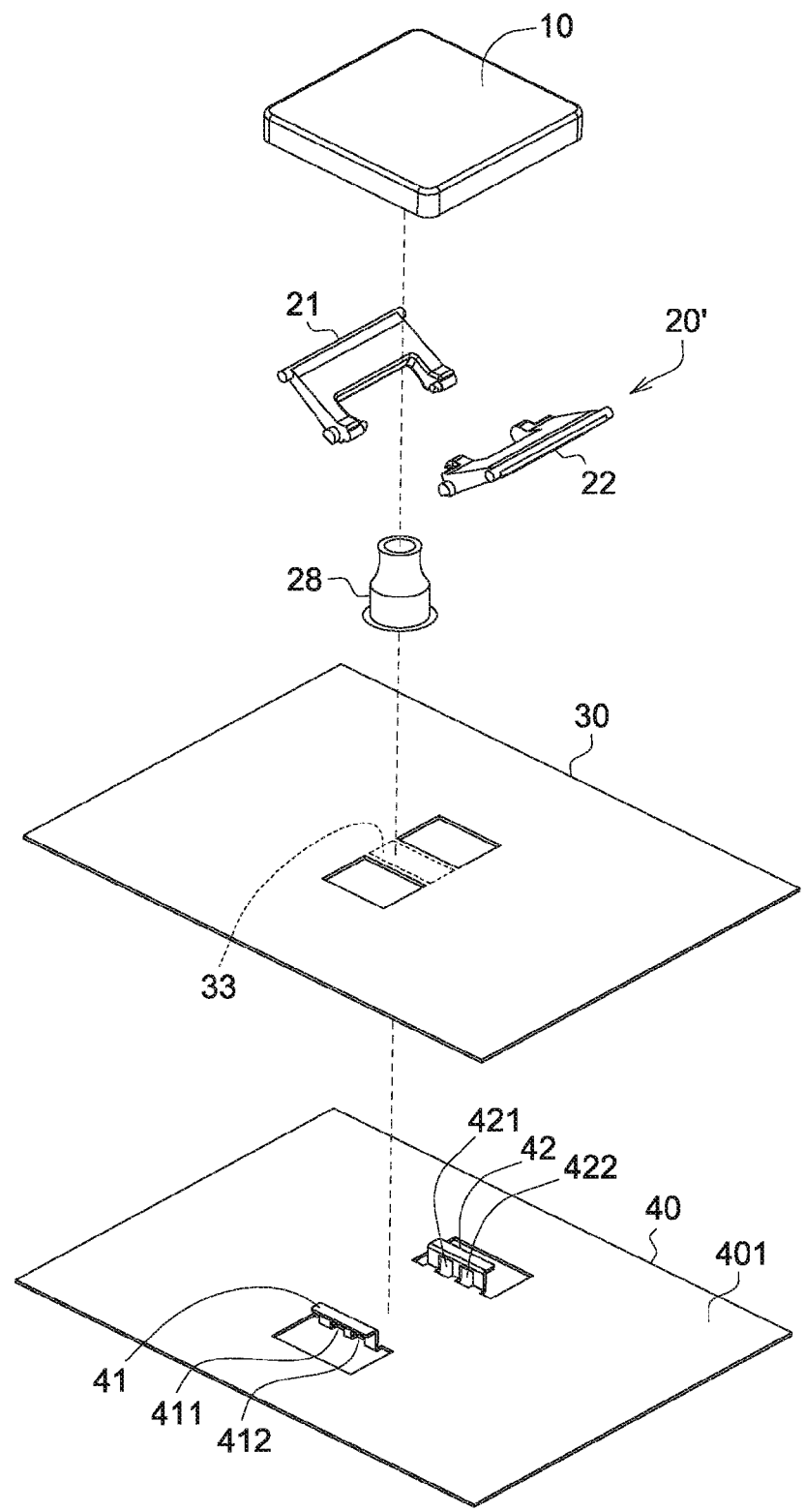

Refer to FIG. 2. In an embodiment, the attractable element 25 has a first end 251 and a second end 252. The first end 251 corresponds to a first attractive position P1, and the second end 252 corresponds to a second attractive position P2. Additionally, the magnet 26 provides a magnetic force and is movable between the underneath of the first attractive position P1 and the second attractive position P2. When the first end 251 of the attractable element 25 is attracted by the magnetic force and generates a reaction force to the bridge assembly 20, the first end 251 of the attractable element 25 is moved to the first attractive position P1 with respect to the axis A1 (refer to FIG. 4, FIG. 6A and FIG. 6B), so that the first hinge part 21 and the second hinge part 22 can be activated through the reaction force (that is a releasing status as indicated in FIG. 6A or FIG. 7A). Besides, when the second end 252 of the attractable element 25 is attracted by a magnetic force and generates a reaction force to the bridge assembly 20, the second end 252 of the attractable element 25 is moved to the second attractive position P2 with respect to the axis A1 (refer to FIG. 4, FIG. 6A and FIG. 6B), so that the first hinge part 21 and the second hinge part 22 can be activated through the reaction force (that is a storing status as indicated in FIG. 7B). Therefore, by changing the attraction between the magnet 26 and the first end 251 or the attraction between the magnet 26 and the second end 252 of the attractable element 25 to move the first hinge part 21 and the second hinge part 22, the bridge assembly 20 of the present embodiment can be switched between the releasing status and the storing status.

In an embodiment, the attractable element 25 can be formed of a ferromagnetic material, and the magnet 26 can be formed of a permanent magnet or an electromagnet.

Refer to FIG. 2. In an embodiment, the key cap 10 includes a plurality of link bar supporting portions 102 on the bottom of key cap 10 for fixing or slidably supporting the first link bar 211 of the first hinge part 21 and the second link bar 221 of the second hinge part 22. In an embodiment, a first actuation portion 214 is protruded and disposed at the part in the outer side of the first hinge part 21 near the first link bar 211. The first actuation portion 214 is correspondingly located above a touch portion 32, such that when the key cap 10 is pressed, the first actuation portion 214 can touch the touch portion 32 to generate a key pressing signal. In another embodiment, a second actuation portion 224 is protruded and disposed at the part in the outer side of the second hinge part 22 near the second link bar 221. The second actuation portion 224 is correspondingly located above another touch portion 32, such that when the key cap 10 is pressed, the second actuation portion 224 can contact the other touch portion 32 to generate a key pressing signal. In other words, the key structure 2 of the invention has at least one actuation portion contacting at least one touch portion 32 to generate a key pressing signal.

Refer to FIG. 2. In an embodiment, a stopping portion 225 protruded outside more than the second actuation portion 224 is disposed at the outer side of the first hinge part 21 and/or the second hinge part 22 and correspondingly located above the second attractive position P2. When the magnet 26 is moved to the underneath of the second attractive position P2 to attract the second end 252 of the attractable element 25, the stopping portion 225 contacts the magnet 26 (the second attractive position P2 of FIG. 7B), so that the second actuation portion 224 cannot contact the touch portion 32, hence avoiding the key pressing signal being generated during the storing status. Detailed structures of the stopping portion 225 not disclosed here can be obtained with reference to the descriptions of FIGS. 6B and 7B.

Figure 3:
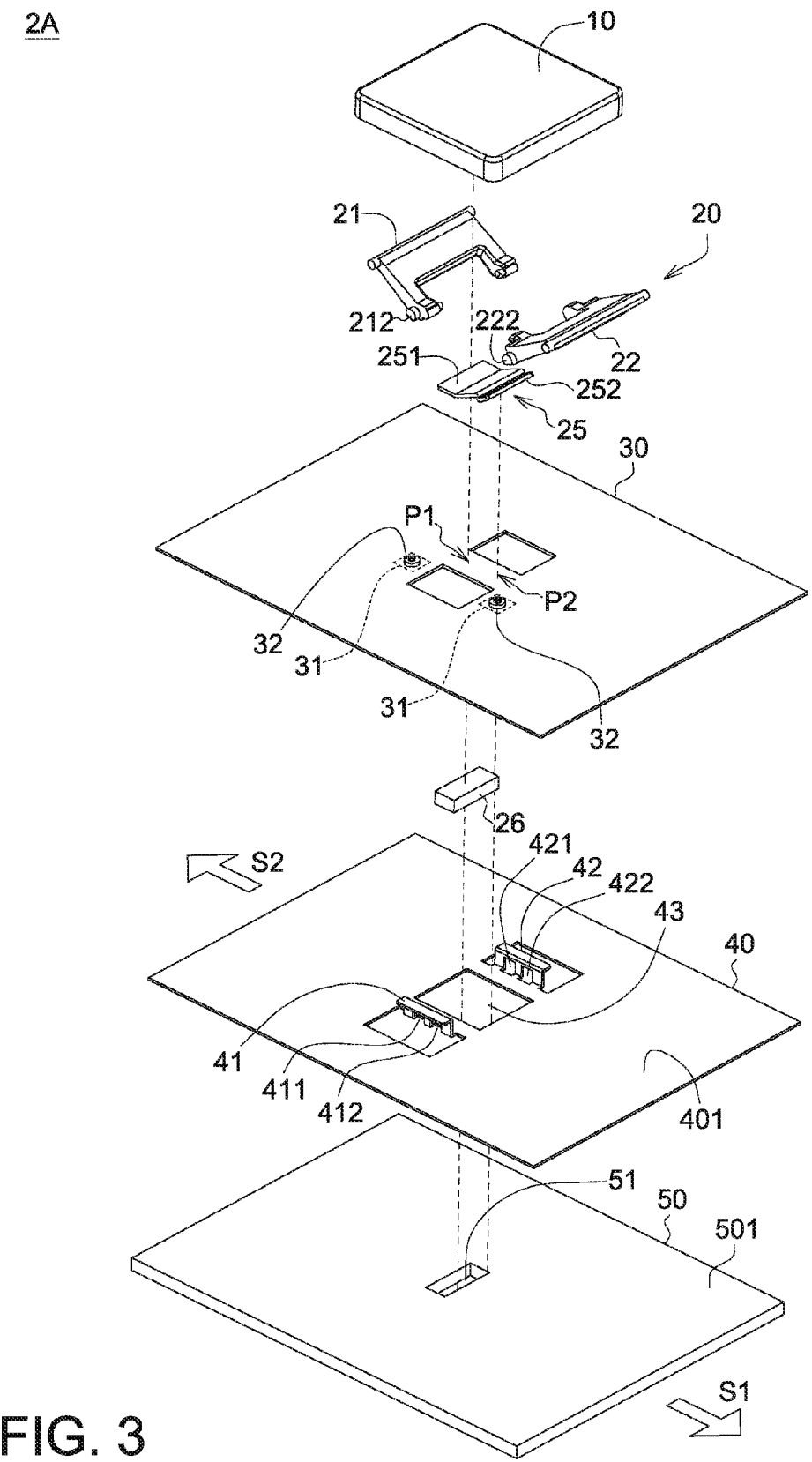
FIG. 3 is a decomposition diagram of a key structure before assembly according to an embodiment of the invention.
Figures 1, 3:
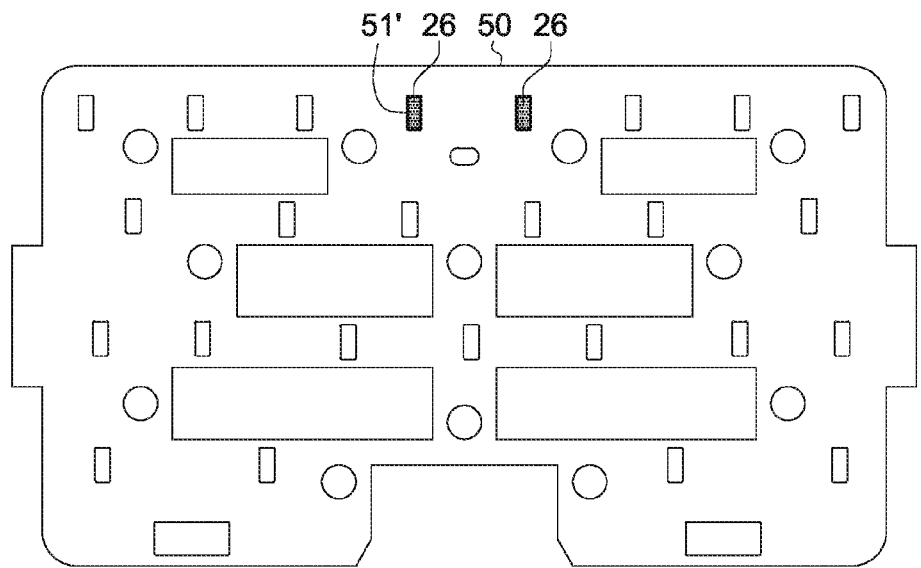
Figures 2, 3:
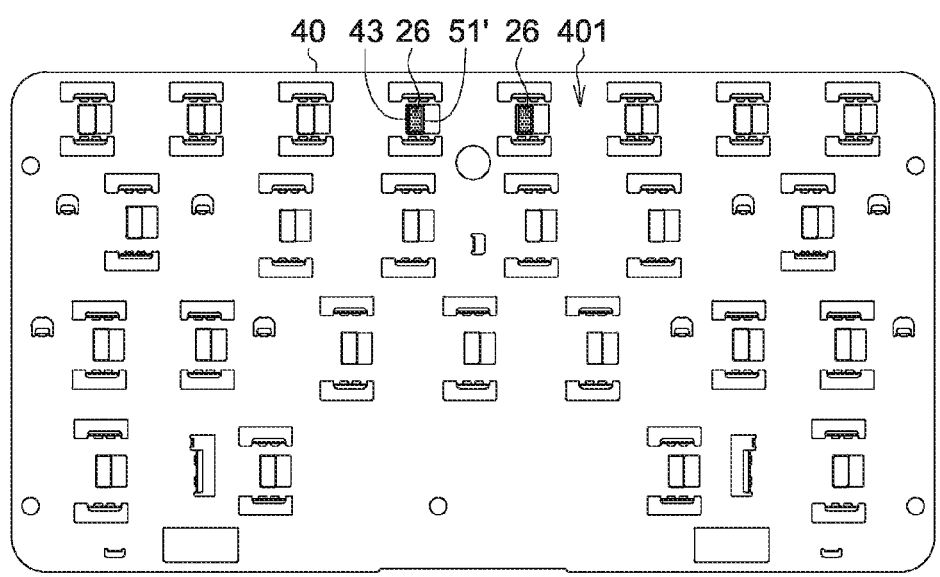
Figure 3:
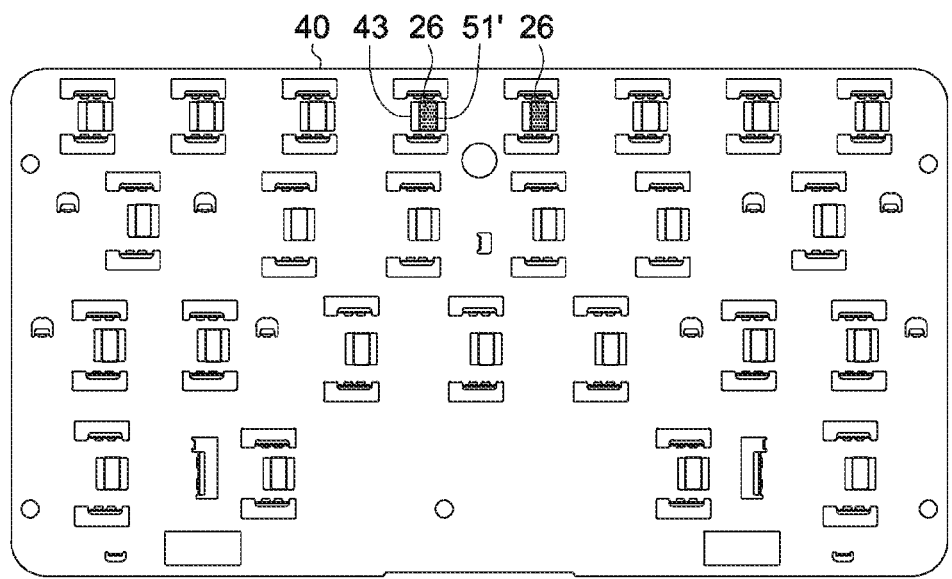

Refer to FIG. 3, a decomposition diagram of a key structure 2A before assembly according to an embodiment of the invention is shown. In an embodiment, the key structure 2A further includes a film circuit board 30, a supporting board 40 and a base board 50. The film circuit board 30 can be disposed on the supporting board 40 or integrally formed in one piece with the supporting board 40. In an embodiment, the supporting board 40 is disposed on the base board 50 and can slide with respect to the base board 50.

Refer to FIG. 3. In an embodiment, the touch portion 32 is disposed on the film circuit board 30 and corresponds to a position of a switch element 31 of the film circuit board 30. When the touch portion 32 is pressed, the switch element 31 disposed under the touch portion 32 is activated to generate a key pressing signal. The key pressing signal can be transmitted to a position processor (not illustrated) via the circuit of the film circuit board 30. Then, the position processor calculates the coordinate position of the key and generates a key pressing instruction corresponding to the key.

In an embodiment, the touch portion 32 can be formed of an elastic material such as rubber, epoxy resin, semi-cured colloid or plastics in the shape of a dome.

In an embodiment, the switch element 31 includes an upper conductive layer and a lower conductive layer (not illustrated), which are separated by a gap. When the touch portion 32 is pressed, the upper conductive layer and the lower conductive layer contact each other to generate a key pressing signal.

Refer to FIG. 3. The supporting board 40 includes a first supporting part 41 and a second supporting part 42 which are opposite to each other and erected on the supporting side 401. The first supporting part 41 includes two first pivot holes 411 and 412, and the second supporting part 42 includes two second pivot holes 421 and 422. The first pivot holes 411 and 412 and the second pivot holes 421 and 422 are disposed oppositely for receiving two ends of the first pivot coupling portion 212 and two ends of the second pivot coupling portion 222, respectively. In an embodiment, the two ends of the first pivot coupling portion 212 of the first hinge part 21 can be located at the first pivot hole 411 and the second pivot hole 421, respectively; the two ends of the second pivot coupling portion 222 of the second hinge part 22 can be located at the other first pivot hole 412 and the other second pivot hole 422, respectively. Thus, the key cap 10 can be assembled onto the supporting board 40 through the bridge assembly 20 and can move upward/downward with respect to the supporting board 40. The movement of the first pivot coupling portion 212 and the second pivot coupling portion 222 can be obtained with reference to the descriptions of FIGS. 15, 16-1 and 16-2.

Referring to FIG. 3, the base board 50 can be a metal board or a reinforced plastic substrate. The base board 50 is disposed under the supporting board 40 to reinforce the rigid structure of the supporting board 40. In other words, the base board 50 can be used as a base of the keyboard, and there is no need to additionally dispose a board on the base of the keyboard, hence reducing the weight and cost of the keyboard. In another embodiment, when the supporting board 40 has sufficient rigidity, the supporting board 40 can also be used as a base of the keyboard and there is no need to additionally dispose the base board 50 under the supporting board 40.

Refer to FIG. 3. In an embodiment, the supporting board 40 is a fixing board, the base board 50 is a sliding board, and the base board 50 can move along a first sliding direction S1, so that the base board 50 and the supporting board 40 can slide with respect to each other. In another embodiment, the base board 50 is a fixing board, the supporting board 40 is a sliding board, and the supporting board 40 can move along a second sliding direction S2 inverse to the first sliding direction S1, so that the base board 50 and the supporting board 40 can slide with respect to each other. In other words, as long as one of the base board 50 and the supporting board 40 is slidable, relative movement can be generated between the base board 50 and the supporting board 40.

Refer to FIG. 3. In an embodiment, the supporting board 40 has a first opening 43, and the base board 50 has a second opening 51. The first opening 43 and the second opening 51 are basically located under the attractable element 25 and are capable of receiving the magnet 26. The second opening 51 can fix the magnet 26 on the base board 50. The size of the first opening 43 is, for example, larger than that of the second opening 51. The first opening 43 provides an operation space, so that the magnet 26 is movable between the underneath of the first attractive position P1 and the underneath of the second attractive position P2. In an embodiment, the magnet 26 is placed in a fixed position on the base board 50 or on the C part of notebook's keyboard area. The base board 50 can be part of, or otherwise integrated with, the C part of a traditional laptop computer or assembled into the laptop computer's keyboard area. For example, by sliding the supporting board 40 back and forth, either the first end 251 or the second end 252 of the attractable element 25 can be moved to a position above or proximate to the magnet 26.

In an embodiment, when the magnet 26 is disposed in the second opening 51 passing through the base board 50, a bonding layer 60 (refer to FIGS. 11A and 11B), such as a polyester film or a Mylar layer, can be disposed under the base board 50 for shielding the underneath of the second opening 51, so that the magnet 26 can be fixed, such as adhering or attaching, on the bonding layer 60 in the second opening 51 of the base board 50.

Refer to FIG. 3-1. In an embodiment, the base board 50 has a receiving space 51' for fixing the magnet 26 of each key structure on the base board 50. The receiving space 51', such as a recess, does not pass through the base board 50 and has an opening facing upward.

Figures 3, 4:
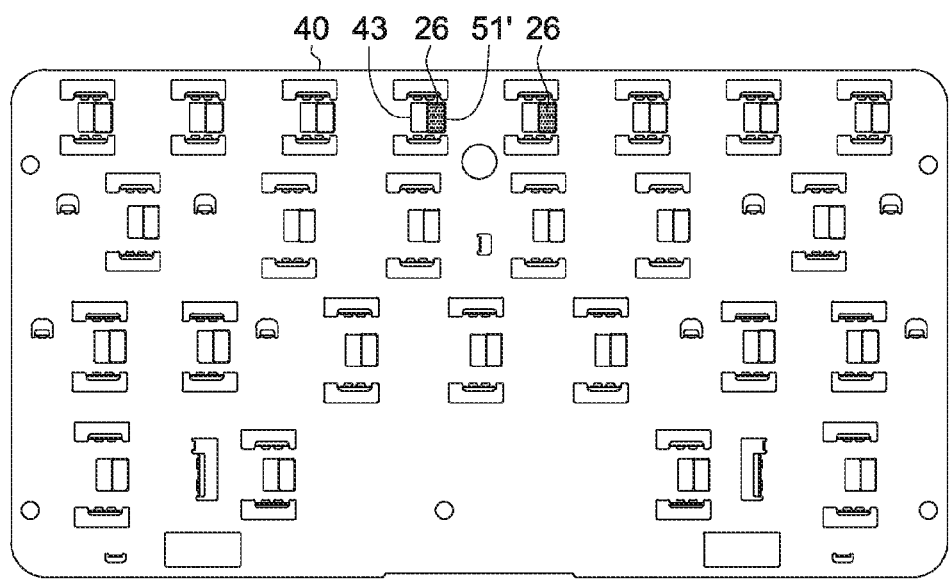

Refer to FIG. 3-2. The supporting board 40 is disposed on the base board 50 of FIG. 3-1, and has a first opening 43 correspondingly located above the receiving space 51'. The magnet 26 of each key structure is disposed in the receiving space 51' (or the second opening 51) respectively, and has a height above the upper surface 401 of the supporting board 40. Therefore, the magnet 26 can be used as a positioning part when the supporting board 40 or the base board 50 slides. When the supporting board 40 and the base board 50 slide with respect to each other, the magnet 26 is moved to the center from one side of the first opening 43 and is further moved to the other side of the first opening 43 from the center as indicated in FIGS. 3-2, 3-3 and 3-4. Therefore, the contact between the edge of the first opening 43 of the supporting board 40 and the magnet 26 of each key structure can limit the scope of movement of the base board 50.

Figures 3, 4, 5:
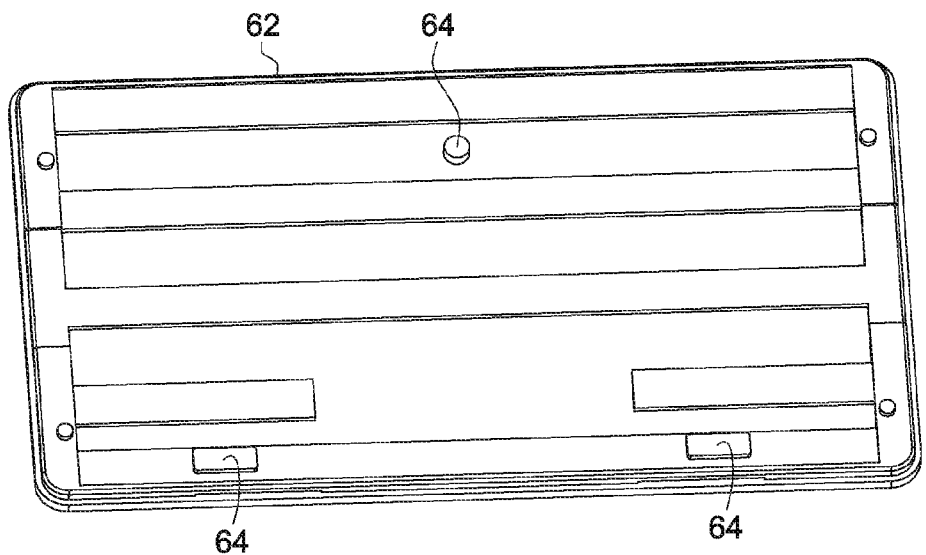

Referring to FIG. 3-5, a schematic diagram of a lower casing 62 (or a lower cover) used for positioning purpose is shown. In an embodiment, the lower casing 62 has a plurality of positioning parts 64 correspondingly located in the third openings 54 of the base board 50 of FIG. 3-6. Refer to FIG. 3-6. The base board 50 can be disposed above the lower casing 62 and has a plurality of third openings 54 for receiving the positioning parts 64 respectively. Refer to FIGS. 3-6-3-8. When the base board 50 slides with respect to the lower casing 62, the positioning parts 64 are moved to the other side from one side of the third openings 54, and contact the edge of the third opening 54 to limit the scope of movement of the base board 50. In the present embodiment, the height of the magnets 26 cannot be over the upper surface 401 of the supporting board 40.

FIG. 4 is a schematic diagram of a key structure 2A after assembly according to an embodiment of the invention. Refer to FIG. 4. In an embodiment, the first hinge part 21 and the second hinge part 22 are assembled onto the supporting board 40 through the first supporting part 41 and the second supporting part 42, respectively. After assembly, the first hinge part 21 and the second hinge part 22 are connected as one piece and the rotation center is located on the axis A1. Refer to FIGS. 1 and 4. Since the first shaft X1 and the first pivot coupling portion 212 are not coaxial and the second shaft X2 and the second pivot coupling portion 222 are not coaxial either, the first pivot coupling portion 212, the second pivot coupling portion 222 and the axis A1 used as the rotation center form three non-coaxial hinge points (such as in the shape of W). Therefore, after assembly, the first hinge part 21 and the second hinge part 22 basically form a W-shaped structure.

Figure 5A:
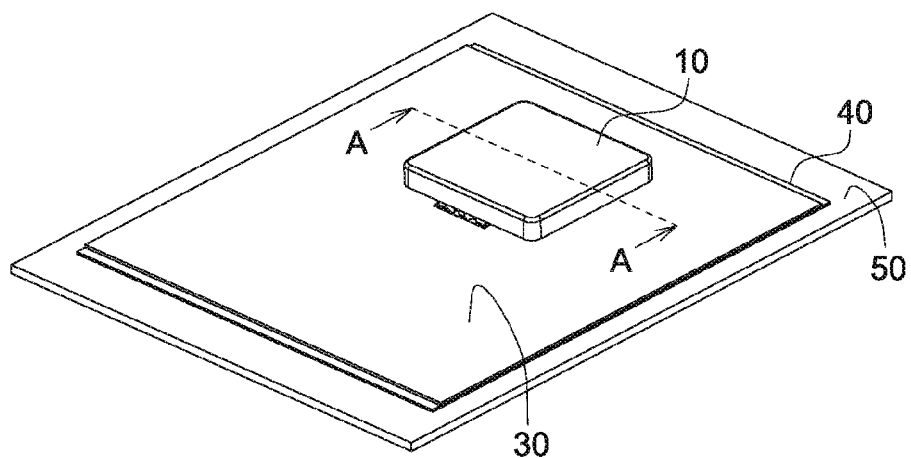
FIGS. 5A and 5B are appearance diagrams of the key structure of FIG. 4 in a releasing status (that is, a serviceable status such as when the upper cover of the portable computer is opened) and a storing status (such as when the upper cover and the body of the portable computer are closed), respectively.

FIG. 5A is an appearance diagram of the key structure 2A of FIG. 4 in a releasing status. FIGS. 6A and 6B are cross-sectional views of a key structure 2A along an A-A cross-sectional line of FIG. 5A changed to a pressing status from a releasing status. Refer to FIG. 6A. In an embodiment, when the key cap 10 is not pressed, the first end 251 of the attractable element 25 is attracted by the magnet 26 and fixed at the first attractive position P1, so that the key cap 10 and the bridge assembly 20 enter a releasing status. Refer to FIG. 6B. When the key cap 10 is pressed, the first end 251 of the attractable element 25 is driven to move away from the magnet 26, so that the key cap 10 is moved to a pressing position from a releasing position. Then, when the key cap 10 is released, the first end 251 of the attractable element 25 is again attracted by the magnet 26, so that the key cap 10 and the bridge assembly 20 are driven to the releasing position by the magnetic force. Therefore, when the user presses or releases the key structure 2A, the key structure 2A is moved upward and downward between a pressing position and a releasing position by the magnetic force.

Figure 5B:
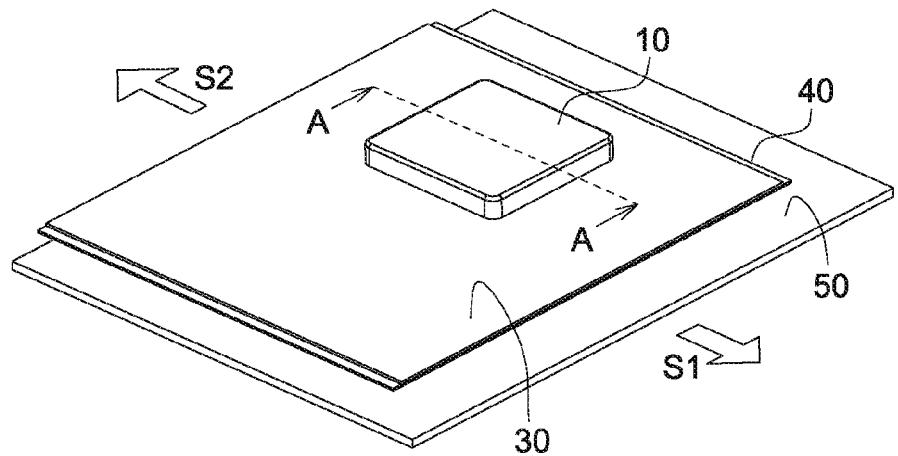

FIG. 5B is an appearance diagram of the key structure 2A of FIG. 4 in a storing status. FIGS. 7A and 7B cross-sectional views of the key structure 2A along an A-A cross-sectional line of FIG. 5B changed to a storing status from a releasing status. Refer to FIG. 5B. In an embodiment, the base board 50, such as a sliding board, slides with respect to the supporting board 40 along a first sliding direction S1, so that the key structure 2A enters a storing status. Alternatively, the supporting board 40, such as a sliding board, slides with respect to the base board 50 along a second sliding direction S2, so that the key structure 2A' enters a storing status. Refer to FIG. 7A. In an embodiment, when the key cap 10 is not pressed (that is, in a releasing status), the first end 251 of the attractable element 25 is attracted by the magnet 26, so that the key cap 10 and the bridge assembly 20 are attracted by the magnetic force and fixed on a releasing position. Refer to FIG. 7B. In an embodiment, when the base board 50 slides with respect to the supporting board 40 along a first sliding direction S1, the second end 252 of the attractable element 25 is attracted by the magnet 26 moved to the second attractive position P2, so that the key cap 10 and the bridge assembly 20 are attracted by the magnetic force and moved to a storing position (that is, in a storing status) from the releasing position (that is, in a releasing status). When the key cap 10 is moved to the storing position, the receiving space that the key structure 2A' requires will be relatively reduced, and the overall height of the key structure 2A' will be reduced accordingly. Such condition makes the key structure having a lower height, so that it is benefited the storage of keyboard. For example, a keyboard of laptop computer with a lower height, and the screen can be folded upon the keyboard. Laptop computer can become slimmer than a conventional laptop computer.

In an embodiment, when the base board 50 inversely slides with respect to the supporting board 40 along the second sliding direction S2, the first end 251 of the attractable element 25 will again be attracted by the magnet 26 moved to the first attractive position P1, so that the key cap 10 and the bridge assembly 20 are attracted by the magnetic force and moved to a releasing position. Therefore, the key structure 2A' can be changed to a releasing position or a storing position by sliding the base board 50 or the supporting board 40. The same key storage effect can be achieved by sliding the base board 50 with respect to the supporting board 40 or sliding the supporting board 40 with respect to the base board 50, and the invention does not have specific restrictions thereto.

Detailed descriptions of the stopping portion 225 can be obtained with reference to FIGS. 6B and 7B. In an embodiment, the stopping portion 225 can be a protrusion with a predetermined height. As indicated in FIG. 6B, when the key cap 10 is pressed to enter a pressing status, the magnet 26 is not moved and is not located under the stopping portion 225, so the each of first actuation portion 214 and the second actuation portion 224 can actually contact a corresponding touch portion 32 disposed thereunder to generate a key pressing signal. As indicated in FIG. 7B, when the key cap 10 enters a storing status, the magnet 26 is moved to the underneath of the stopping portion 225, and the stopping portion 225 moves downward to collide with the magnet 26 (the thin film circuit board 30 is interposed therebetween) on the second attractive position P2, such that the key cap 10 is stopped at a predetermined height and cannot reach the pressing position (that is, the first actuation portion 214 or the second actuation portion 224 cannot contact the touch portion 32 disposed underneath). Therefore, since the height of the key cap 10 at the stopping position is slightly higher than that at the pressing position, the key structure 2A of the present embodiment will not generate any key pressing signals or malfunctions in the storing status.

Figures 3, 4, 5, 6:
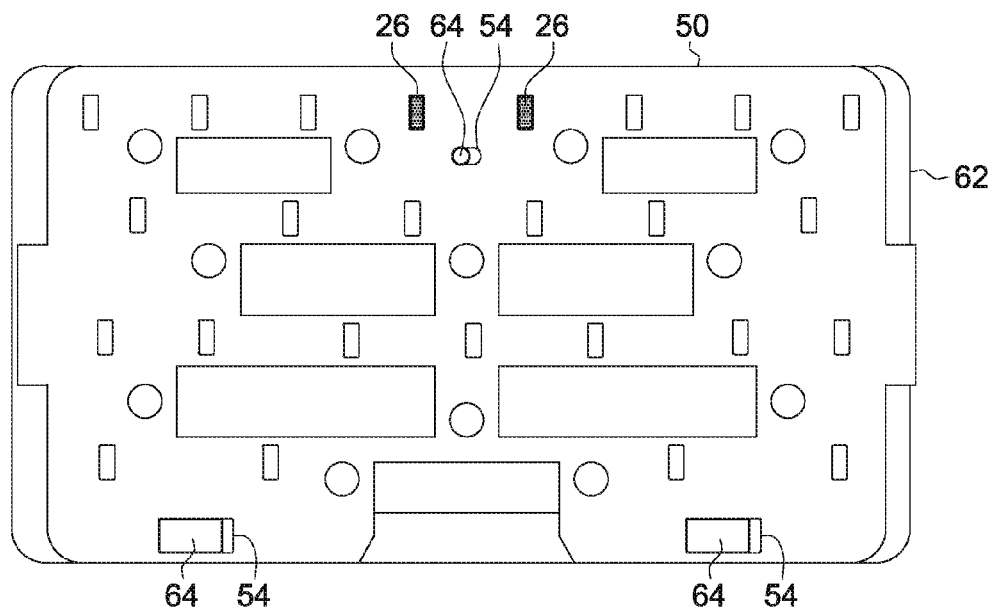
Figures 3, 4, 5, 6, 7:
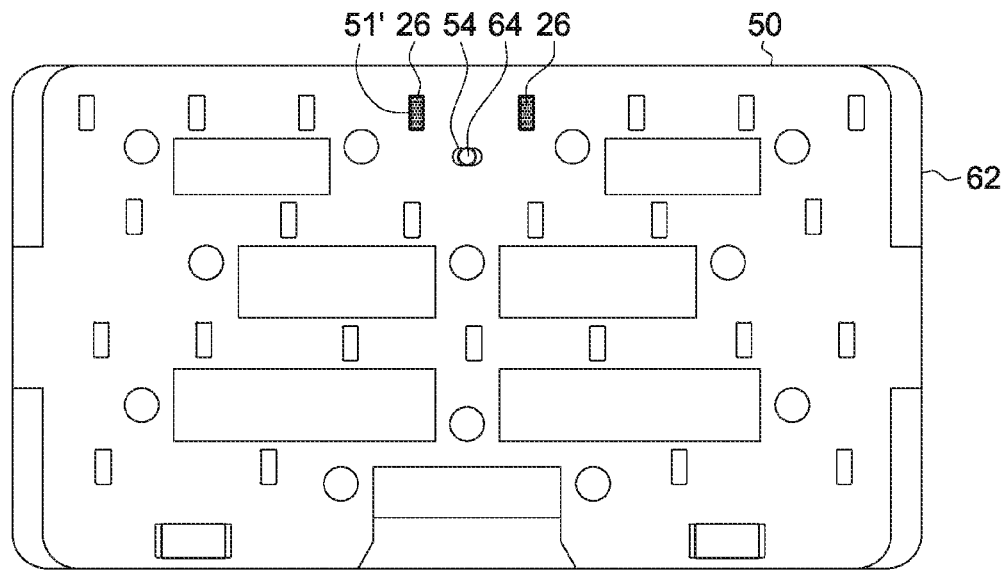
Figures 3, 4, 5, 6, 7, 8:
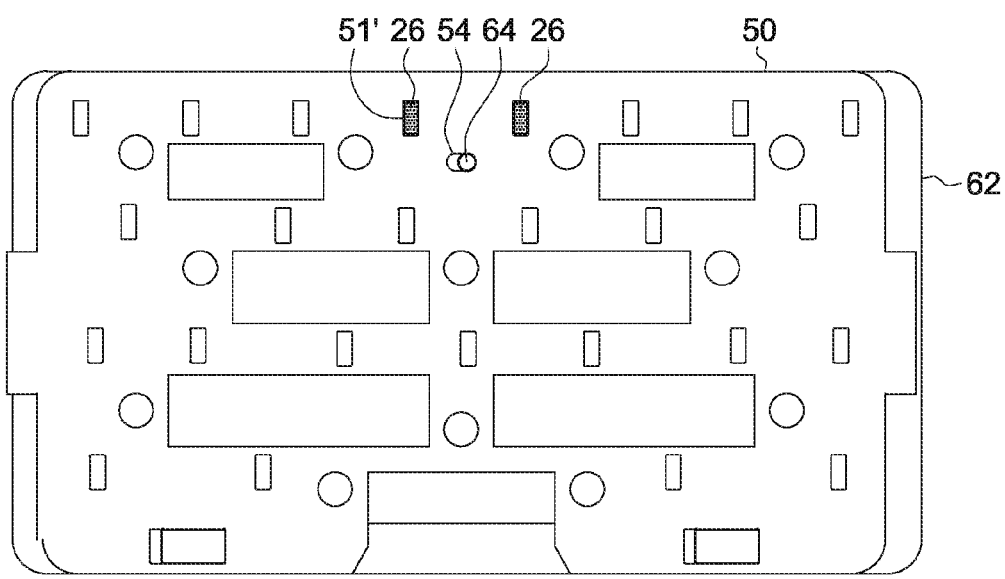
Figure 4:
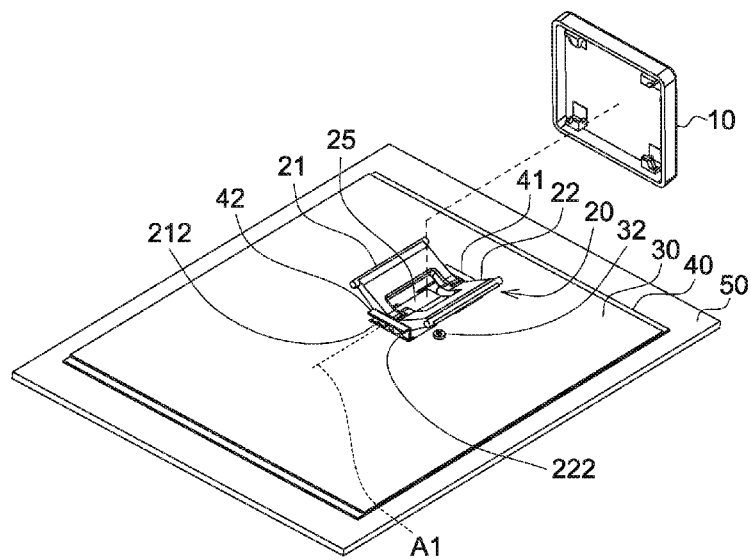

Refer to FIG. 8, a decomposition diagram of a key structure 2B before assembly according to another embodiment of the invention is shown. The key structure 2B includes a key cap 10, a bridge assembly 20', an elastic member 28, a thin film circuit board 30 and a supporting board 40. The elastic member 28 replaces the assembly of the attractable element 25 and the magnet 26. The elastic member 28 is disposed under the key cap 10 and located between the first hinge part 21 and the second hinge part 22. The elastic member 28 is deformed when the key cap 10 is pressed, and generates a recovery elastic force when the key cap 10 is released. Therefore, the key cap 10 and the bridge assembly 20' can be moved upward and downward between a releasing position and a pressing position by the elastic force of the elastic member 28. Additionally, the elastic member 28 is disposed on the thin film circuit board 30 and correspondingly located at a switch element 33. When the elastic member 28 is pressed, the switch element 33 disposed under the elastic member 28 is activated to generate a key pressing signal. The elastic member 28 is recovered from the aforesaid deformation when the key cap 10 is released. Therefore, there is no need to dispose any of the first actuation portion 214, the second actuation portion 224 and the stopping portion 225 on the bridge assembly 20' of the present embodiment, and there is no need to disposed two corresponding touch portions 32 on the film circuit board 30 either.

Figure 9:
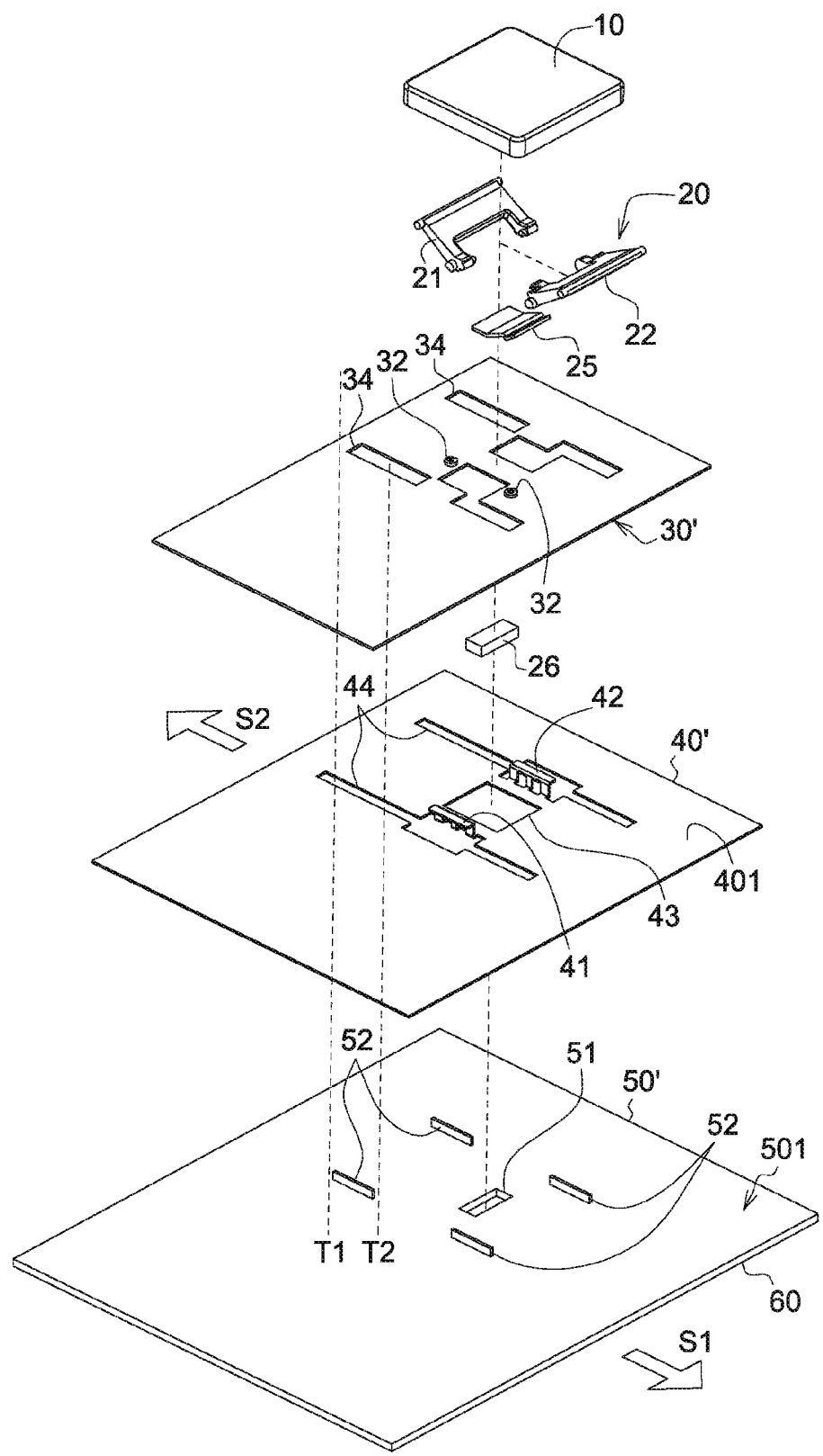
FIGS. 9-10 are a decomposition diagram of a key structure before assembly and a schematic diagram thereof after assembly respectively according to an embodiment of the invention.
Figure 10:
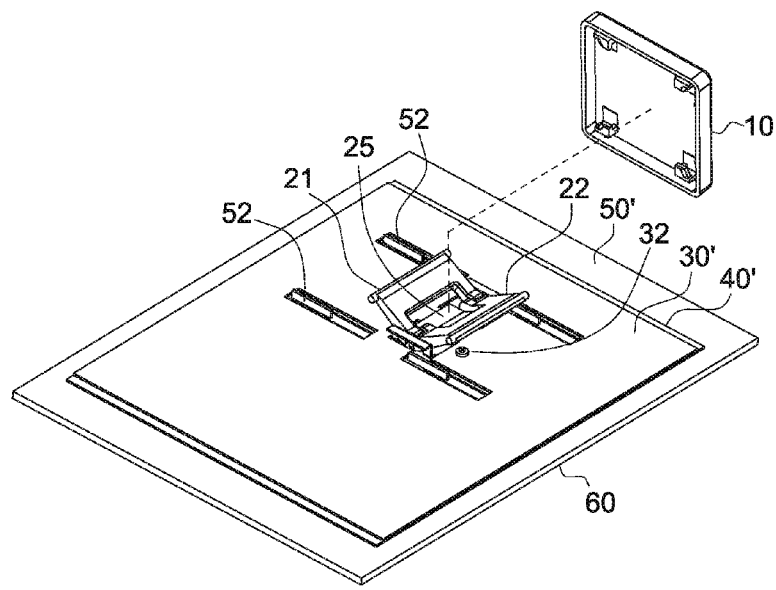

FIGS. 9-10 are a decomposition diagram of a key structure 2C before assembly and a schematic diagram thereof after assembly respectively according to an embodiment of the invention. Refer to FIG. 9. The key structure 2C includes a key cap 10, a bridge assembly 20, an attractable element 25, a magnet 26, a thin film circuit board 30', a supporting board 40', a base board 50' and a bonding layer 60. In an embodiment, the base board 50' includes a plurality of stopping parts 52 erected on the upper surface 501, and the supporting board 40' and the thin film circuit board 30' include a plurality of first grooves 44 and a plurality of second grooves 34, and each stopping part 52 is received in corresponding first groove 44 and second groove 34. The stopping parts 52 are disposed in parallel along a first sliding direction S1 or a second sliding direction S2. In an embodiment, the base board 50', such as a sliding board, slides with respect to the supporting board 40' along the first sliding direction S1, so that the stopping part 52 is moved to a stopping position T2 from a non-stopping position T1 and contacts the key cap 10. In another embodiment, the supporting board 40', such as a sliding board, slides with respect to the base board 50' along the second sliding direction S2, so that the stopping part 52 is moved to a stopping position T2 from a non-stopping position T1 and contacts the key cap 10. The stopping part 52 can be a rectangular piece with a predetermined height.

Figure 11A:
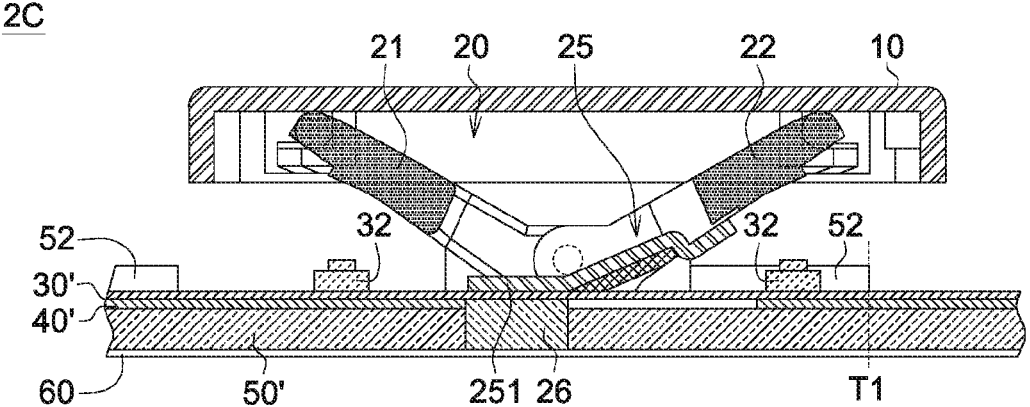
FIGS. 11A and 11B are cross-sectional views of the key structure of FIG. 10 when the key structure is changed to a storing status from a releasing status.
Figure 11B:
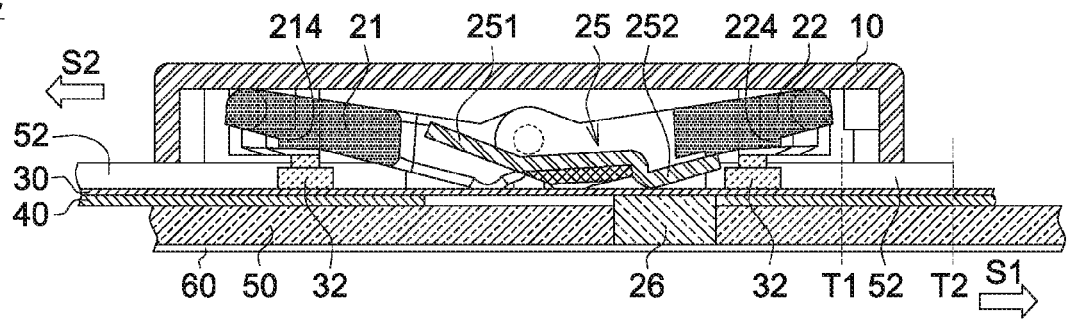

FIGS. 11A and 11B are cross-sectional views of the key structure 2C of FIG. 10 when the key structure 2C is changed to a storing status from a releasing status. Refer to FIG. 11A. In an embodiment, when the key cap 10 is not pressed, the first end 251 of the attractable element 25 is attracted by the magnet 26, so that the key cap 10 and the bridge assembly 20 remain at a releasing status through the magnetic force. Refer to FIG. 11B. In an embodiment, when the base board 50' slides with respect to the supporting board 40' along the first sliding direction S1 or when the supporting board 40' slides with respect to the base board 50' along the second sliding direction S2, the second end 252 of the attractable element 25 is attracted by the magnet 26 which has slid, so that the key cap 10 and the bridge assembly 20 are attracted by the magnetic force and moved to a storing position from the releasing position. As indicated in FIG. 11B, when the stopping part 52 is moved to the underneath of one side of the key cap 10 from a non-stopping position T1, the key cap 10 moved downward collides the stopping part 52 moved to the stopping position T2, such that the key cap 10 is stopped at a predetermined height and cannot reach a pressing position. Therefore, since the height of the key cap 10 at the stopping position is slightly higher than that at the pressing position, the first actuation portion 214 and the second actuation portion 224 cannot contact the two corresponding touch portions 32 disposed thereunder, and the key structure 2C will not generate any key pressing signal or malfunctions at the storing status.

In the above embodiments, the key structure 2C can be changed to a storing status from a releasing status as long as the base board 50' slides with respect to the supporting board 40' or the supporting board 40' slides with respect to the base board 50'. Descriptions of the connecting assembly driving the key structure 2C to change to the storing status from the releasing status are disclosed in a number of embodiments below with accompanying drawings.

FIGS. 12A and 12B are cross-sectional views of any key structure (such as 2, 2A, 2A', 2C, 2D and 2E) of the invention disposed in a portable computer 4 and changed to a storing status from a releasing status as the upper cover 7 is closed. Refer to FIG. 12A. The portable computer 4 includes an upper cover 7, a lower cover 5 and a hinge 6. The upper cover 7 and the lower cover 5 are coupled to the hinge 6. The key structure 2C is disposed on the lower cover 5. When the upper cover 7 is rotated with respect to the hinge 6 and opened to an angle θ (such as larger than or equal to 90°), the base board 50' or the supporting board 40' of the key structure 2C is driven by the connecting assembly and makes the key structure 2C enter a releasing status (that is, a serviceable status). Refer to FIG. 12B. When the upper cover 7 is rotated with respect to the hinge 6 and closed on the lower cover 5, the base board 50' or the supporting board 40' of the key structure 2C is driven by the connecting assembly and makes the key structure 2C enter a storing status, such that the overall height of the key structure 2C and the allowable thickness of the portable computer 4 can be effectively reduced.

Refer to FIGS. 12A and 12B. In an embodiment, the connecting assembly includes a moving part 8 coupled between the hinge 6 and the base board 50' or between the hinge 6 and the supporting board 40'. The hinge 6 has first teeth 61, the moving part 8 has second teeth 81, and the first teeth 61 and the second teeth 81 are engaged with each other. Therefore, when the upper cover 7 is rotated with respect to the hinge 6 to be opened or closed, the hinge 6 drives the first teeth 61 and the second teeth 81 so that the base board 50' or the supporting board 40' is driven to slide, and the key structure 2C can be changed between the releasing status and the storing status.

In an embodiment, the moving part 8 can be formed of a part of the base board 50' or the supporting board 40' extended to the underneath of the hinge 6. That is, a part of the base board 50' extended to the underneath of the hinge 6 has a second teeth 81 engaged with the first teeth 61 of the hinge 6. Alternatively, a part of the supporting board 40' extended to the underneath of the hinge 6 has a second teeth 81 engaged with the first teeth 61 of the hinge 6.

In another embodiment, the moving part 8 can also be coupled to the hinge 6 through frictional contact or gripping-driving means, such that the moving part 8 can be driven by the hinge 6 to slide horizontally. Besides, when the moving part 8 is realized by a flexible part, the moving part 8 can be coupled to the hinge 6 through rotating-driving means, so that the moving part 8 can be driven by the hinge 6 to rotate around the hinge 6. Thus, in the present invention, the way for driving the base board 50' or the supporting board 40' is not limited to the use of teeth engagement.

Figures 1, 13:
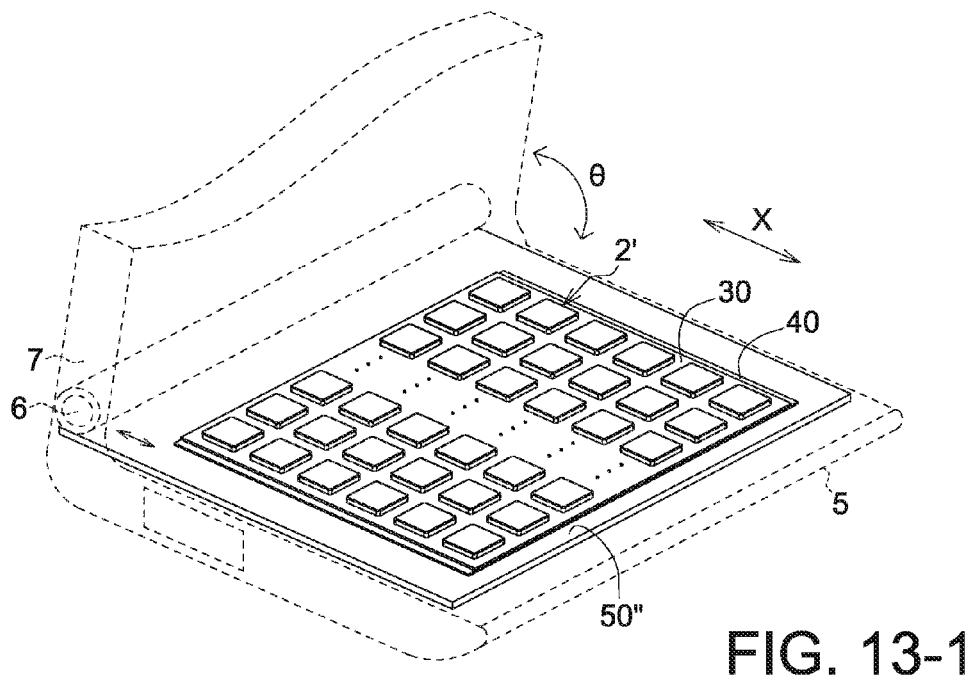
Figures 2, 13:
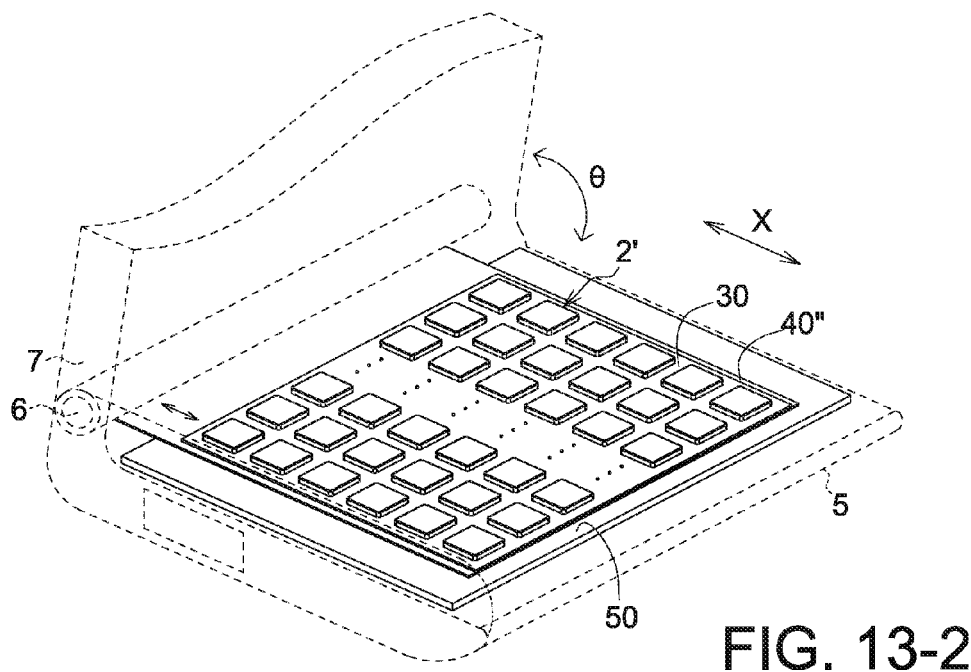
Figures 3, 13:
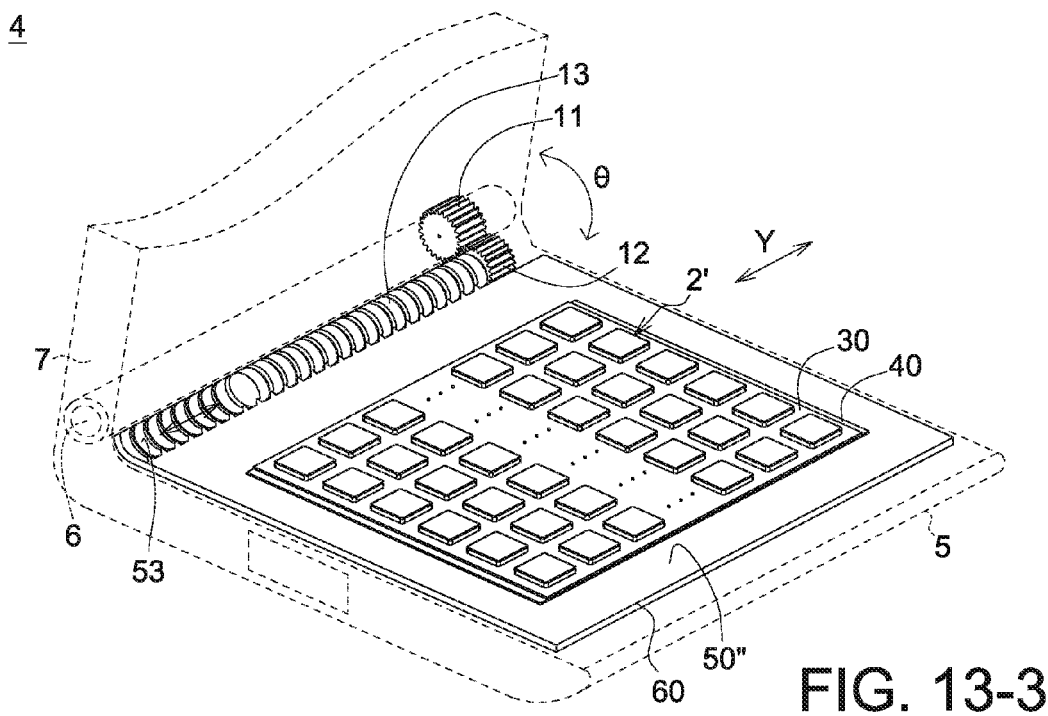
Figures 4, 13:
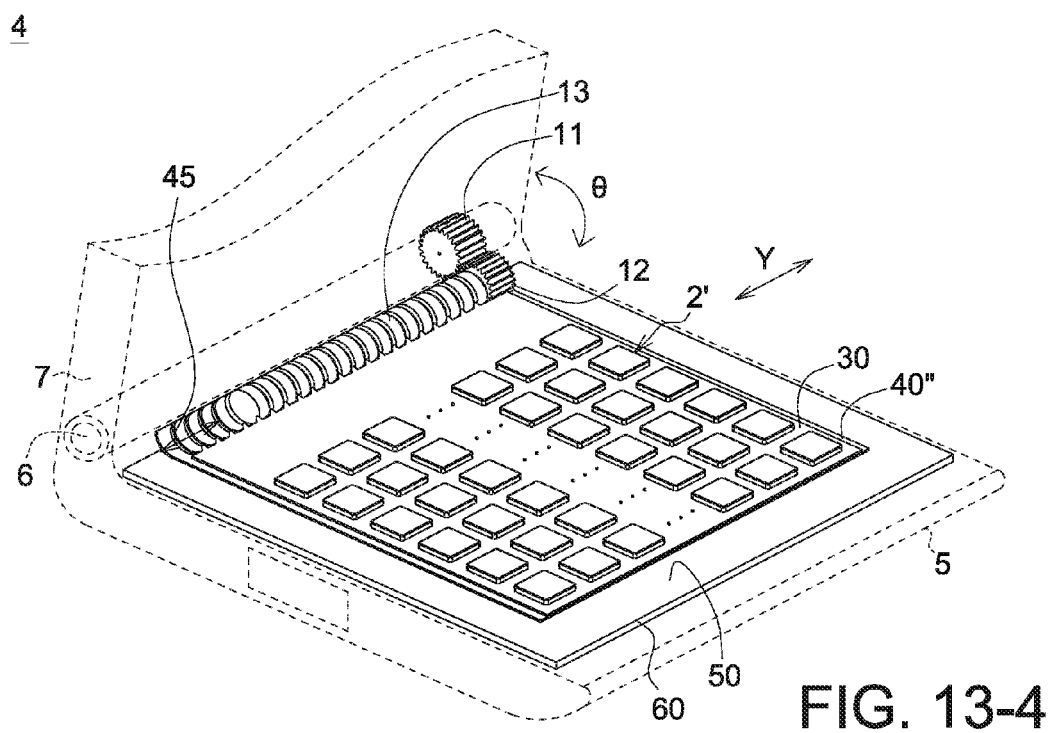
Figures 5, 13:
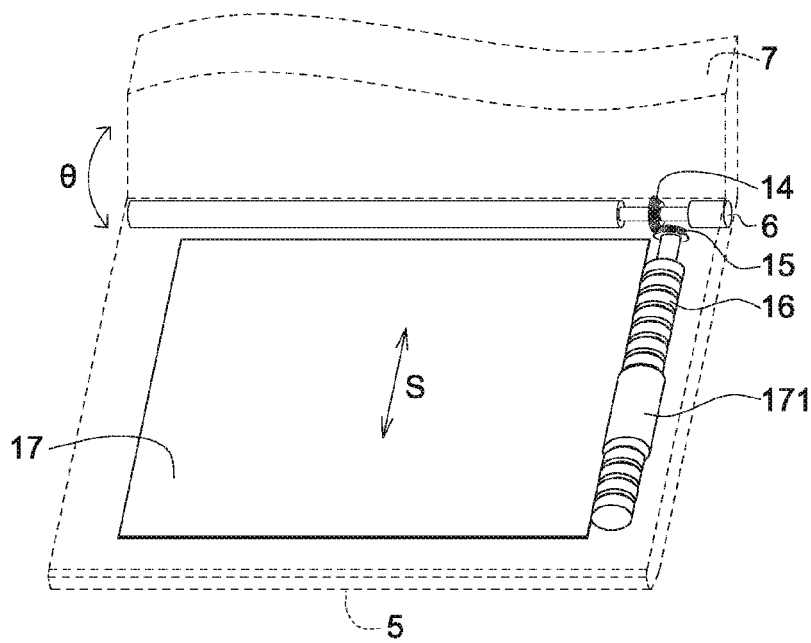
Figures 6, 13:
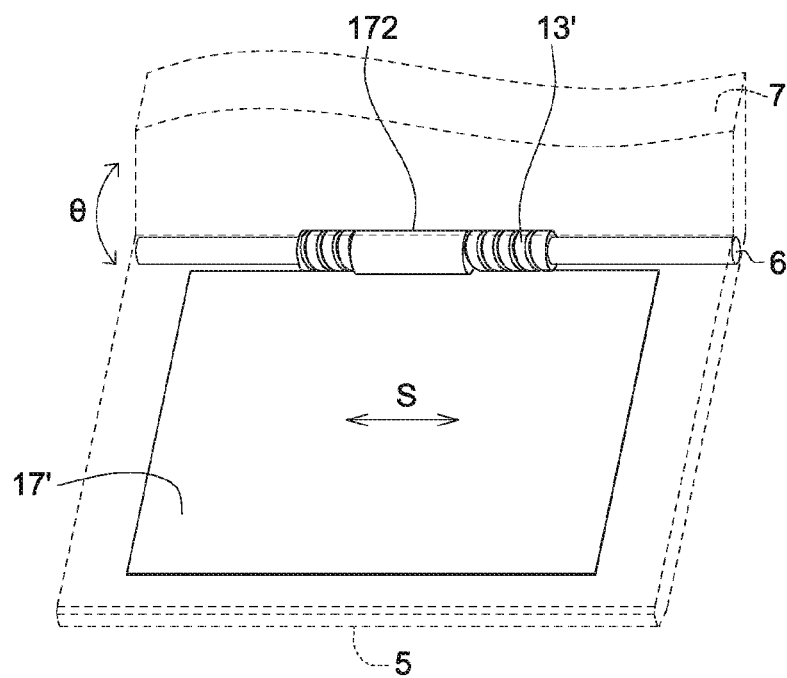
Figures 7, 13:
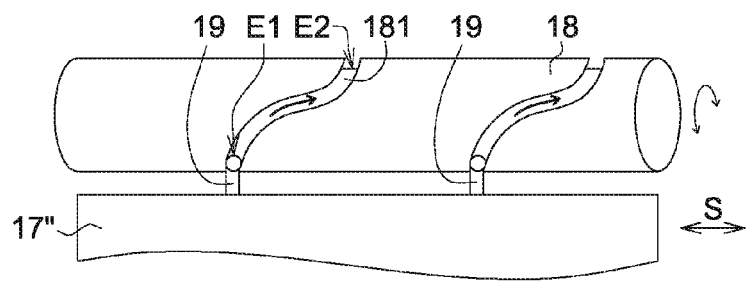

Refer to FIGS. 12A and 12B. In another embodiment, the base board 50' or the supporting board 40' can also be coupled to a controller 9 through the said connecting assembly (such as the moving part 8). When the upper cover 7 is rotated with respect to the hinge 6 to be opened or closed, the controller 9 drives the connecting assembly to slide the base board 50' or the supporting board 40' and makes the key structure 2C enter a releasing status or a storing status. In an embodiment, the controller 9 can drive the moving part 8 by electric power or a magnetic force or can be coupled to the base board 50' or the supporting board 40' through a connecting assembly such as a belt or a gear. Thus, in the present invention, the connecting part for driving the base board 50' or the supporting board 40' is not limited to the hinge 6, and other connecting parts can also be used to drive the base board 50' or the supporting board 40'. That is, the movement of the base board 50 or the supporting board 40 may be electronically driven by the controller 9 in accordance with the status of the portable computer 4 (e.g., when the portable computer 4 is closed)(θ=0° or opened (θ≧90°), respectively). Also, the movement of the base board 50 or the supporting board 40 can be driven by a linking means (that is, the connecting assemblies as shown in FIGS. 13-1-13-7) in accordance with the status of the portable computer 4 or the upper cover 7. For example, the linear motion part of the linking means can be a guide screw, a cam pillar or any other similar structure, and the rotation motion part of the linking means can be a gear assembly or a set of bevel gears.

FIGS. 13-1-13-4 are assembly diagrams of connecting assemblies disposed in a portable computer 4 according to four embodiments of the invention respectively. Refer to FIG. 13-1. In an embodiment, a part of the base board 50" is extended to the underneath of the hinge 6 and is coupled to the hinge 6 by way of teeth engagement, frictional contact, gripping-driving means or rotating-driving means, so that the hinge 6 drives the base board 50" of the key structure 2' to slide along a sliding direction such as the front-and-rear direction X of the portable computer 4. Refer to FIG. 13-2. In an embodiment, a part of the supporting board 40" is extended to the underneath of the hinge 6 and is coupled to the hinge 6 by way of teeth engagement, frictional contact, gripping-driving means or rotating-driving means, so that the hinge 6 drives the supporting board 40" of the key structure 2' to slide along a sliding direction such as the front-and-rear direction X of the portable computer 4.

Refer to FIG. 13-3. In an embodiment, the connecting assembly includes a guide screw 13 parallel with the axial direction of the hinge 6 and coupled to the base board 50" of the key structure 2'. The corresponding surface of the base board 50" has a screw thread 53 or a screw kit (not illustrated), which can be engaged with the screw thread of the guide screw 13, so that the base board 50" can be driven synchronously with the rotation of the guide screw 13.

Refer to FIG. 13-3. The connecting assembly further includes a first gear 11 and a second gear 12. The first gear 11 is coaxial with the hinge 6 or is integrally formed in one piece with the hinge 6. The second gear 12 is coaxial with the guide screw 13 or is integrally formed in one piece with the guide screw 13. The first gear 11 and the second gear 12 are engaged with each other. When the hinge 6 is rotated, the first gear 11 drives the second gear 12 to rotate the guide screw 13 which accordingly drives the base board 50" of the key structure 2' to slide along a sliding direction such as the left-and-right direction Y of the portable computer 4, and the direction Y is the same as the axial direction of the hinge 6.

Refer to FIG. 13-4. In an embodiment, the connecting assembly includes a guide screw 13 parallel to the axial direction of the hinge 6 and coupled to the supporting board 40" of the key structure 2'. The corresponding surface of supporting board 40" has a screw thread 45 or a screw kit (not illustrated), which is engaged with the screw thread of the guide screw 13, so that the supporting board 40" can be driven synchronously with the rotation of the guide screw 13.

Refer to FIG. 13-4. The connecting assembly further includes a first gear 11 and a second gear 12. The first gear 11 is coaxial with the hinge 6 or is integrally formed in one piece with the hinge 6. The second gear 12 is coaxial with the guide screw 13 or is integrally formed in one piece with the guide screw 13. The first gear 11 and the second gear 12 are engaged with each other. When the hinge 6 is rotated, the first gear 11 drives the second gear 12 to rotate the guide screw 13 which accordingly drives the supporting board 40" of the key structure 2' to slide along a sliding direction such as the left-and-right direction Y of the portable computer 4, and the direction Y is the same as the axial direction of the hinge 6.

FIG. 13-5 is a schematic diagram of a connecting assembly used in the portable computer 4. Refer to FIG. 13-5. In an embodiment, the connecting assembly includes a guide screw 16 and two bevel gears 14 and 15. The guide screw 16 is perpendicular to the axial direction of the hinge 6 and coupled to the sliding board 17 (such as the base board or the supporting board) of the key structure. The first bevel gear 14 is coaxial with the hinge 6 or is integrally formed in one piece with the hinge 6. The second bevel gear 15 is coaxial with the guide screw 16 or is integrally formed in one piece with the guide screw 16. The first bevel gear 14 and the second bevel gear 15 are engaged with each other at an angle about 90 degrees. When the hinge 6 is rotated, the first bevel gear 14 drives the second bevel gear 15 to rotate the guide screw 16 which accordingly drives the sliding board 17 (such as the base board or the supporting board) of the key structure to move along a sliding direction S. In an embodiment, the sliding board 17 (such as the base board or the supporting board) is engaged with the screw thread of the guide screw 16 through a screw kit 171, so that the sliding board 17 can be moved synchronously with the rotation of the guide screw 16.

FIG. 13-6 is a schematic diagram of a connecting assembly disposed in a portable computer 4 according to another embodiment of the invention. Refer to FIG. 13-6. In an embodiment, the connecting assembly includes a guide screw 13'. The guide screw 13' is coaxial with the hinge 6 or is integrally formed in one piece with the hinge 6. The screw thread of the guide screw 13' is around the axial direction of the hinge 6, and the guide screw 13' is coupled to the sliding board 17' (such as the base board or the supporting board) of the key structure. That is, in the present embodiment, the guide screw 13 and the hinge 6 are integrated as one piece. When the hinge 6 is rotated, the guide screw 13' drives the sliding board 17' to move along a sliding direction S. In an embodiment, the sliding board 17' (such as the base board or the supporting board) is engaged with the screw thread of the guide screw 13' through a screw kit 172, so that the sliding board 17' can be moved synchronously with the rotation of the guide screw 13.

Refer to FIG. 13-7, a schematic diagram of a connecting assembly using a cam pillar 18 to drive the sliding board 17" according to an embodiment of the invention. In an embodiment, the connecting assembly includes a cam pillar 18 and one or more guide members 19. The cam pillar 18 can be driven by the hinge 6 of the above embodiments or driven to rotate by a driver (such as a motor). The cam pillar 18 has an 8-shaped recess 181 surrounding the cam pillar 18, so that one end of the guide member 19 in the recess 181 can surround the cam pillar 18 for one cycle and return to the initial position. The other end of the guide member 19 is coupled to the sliding board 17" (such as the base board or the supporting board) of the key structure. Therefore, when the cam pillar 18 is driven to rotate, the guide member 19, driven by the cam pillar 18, can move along an axial direction of the cam pillar 18 in the recess 181 and accordingly drive the sliding board 17" to move along a sliding direction S such as the front-and-rear direction X or the left-and-right direction Y of the portable computer 4 disclosed in above embodiments.

In an embodiment, when the cam pillar 18 is rotated for a half cycle (such as 180 degrees), the guide member 19 is moved to a second terminal position E2 from a first terminal position E1 at the 8-shaped recess 181 along the recess 181 to move the sliding board 17" along a sliding direction S. When the cam pillar 18 is rotated in an inverse direction, the guide member 19 returns to the first terminal position E1 from the second terminal position E2 at the 8-shaped recess 181 along the recess 181 to horizontally move the sliding board 17" along a sliding direction S. Refer to FIGS. 12A and 12B. To match the opening/closing design of the upper cover 7, in an embodiment, the first terminal position E1 is a position at which the key structure 2C enters a releasing status, and the second terminal position E2 is a position at which the key structure 2C enters a storing status.

In an embodiment, the said cam pillar 18 replaces the guide screw 13 of FIGS. 13-3 and 13-4 to drive the base board 50" or the supporting board 40". In another embodiment, the said cam pillar 18 replaces the guide screw 16 of FIG. 13-5 or the guide screw 13' of FIG. 13-6, and the said guide member 19 replaces the screw kit 171 or 172. That is, the said cam pillar 18 can be disposed on the hinge 6 as indicated in FIG. 13-6. Furthermore, the said cam pillar 18 and the hinge 6 can be coaxially disposed or integrally formed in one piece.

Figure 14A:
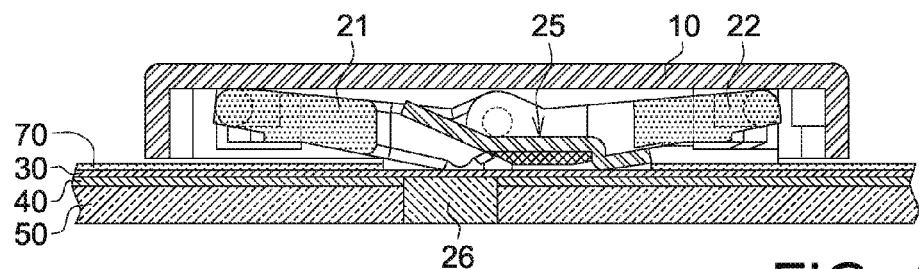
Figure 14B:
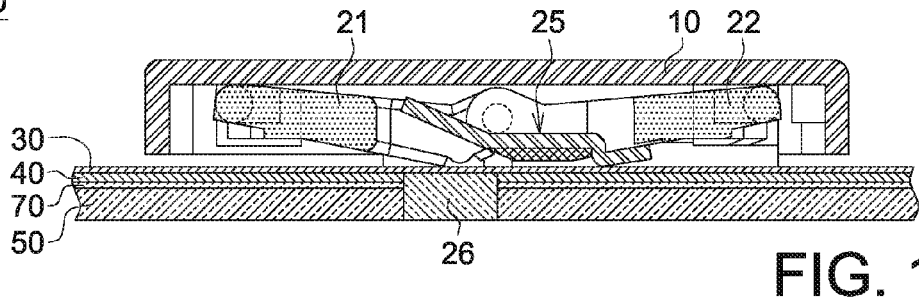
Figure 14C:
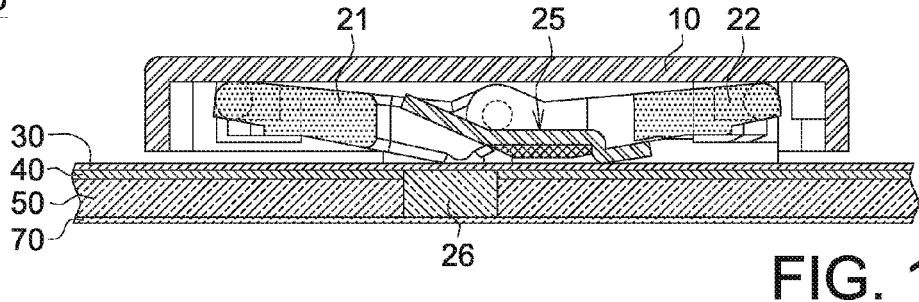

FIGS. 14A-14C are cross-sectional views of a key structure 2D with a backlight module according to three embodiments of the invention. The key structure 2D further includes a backlight module 70, which can be an organic light-emitting diode (OLED) module, a light-emitting diode (LED) module, a self-luminous coating layer or a fluorescent coating layer. As indicated in FIG. 14A, the backlight module 70 is disposed on the thin film circuit board 30. As indicated in FIG. 14B, the backlight module 70 is disposed on the base board 50, and located between the supporting board 40 and the base board 50. As indicated in FIG. 14C, the backlight module 70 is disposed under the base board 50. That is, according to the design of the backlight keyboard, the backlight module 70 can be disposed on the supporting board 40, between the supporting board 40 and the base board 50 or under the base board 50.

Figure 15:
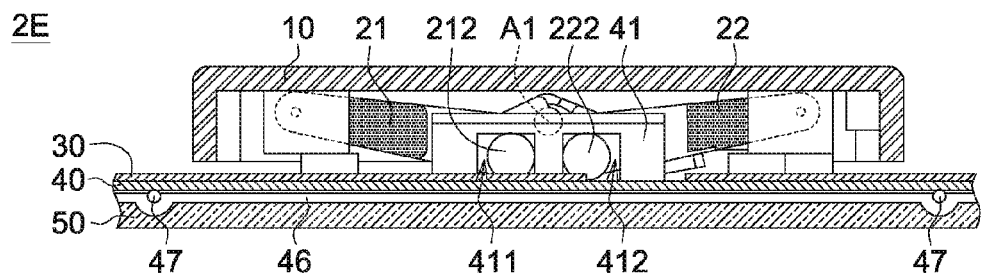
FIG. 15 is a cross-sectional view of a key structure with smoothing function according to an embodiment of the invention.

FIG. 15 is a cross-sectional view of a key structure 2E with smoothing function according to an embodiment of the invention. The key structure 2E further includes a lubricating layer 46, which can be a film having low index of friction and formed of polytetrafluoroethylene (PTFE) or other lubricating material. Refer to FIG. 15. In an embodiment, the lubricating layer 46 is coated on the surface of the supporting board 40 or the base board 50, so that the lubricating layer 46 is located between the supporting board 40 and the base board 50 to reduce the sliding friction. Additionally, the key structure 2E further includes a plurality of rollers 47 disposed between the supporting board 40 and the base board 50 for reducing the contact area between the supporting board 40 and the base board 50 so as to reduce the sliding friction. In an embodiment, the lubricating layer 46 and the rollers 47 can be used concurrently. However, in another embodiment, the lubricating layer 46 and the rollers 47 can be used separately, and the present invention is not limited thereto.

Figures 1, 16:
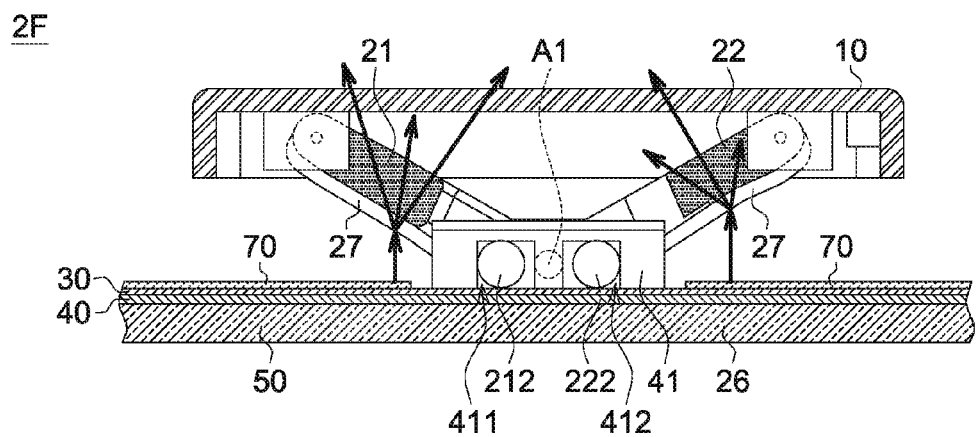
Figures 2, 16:
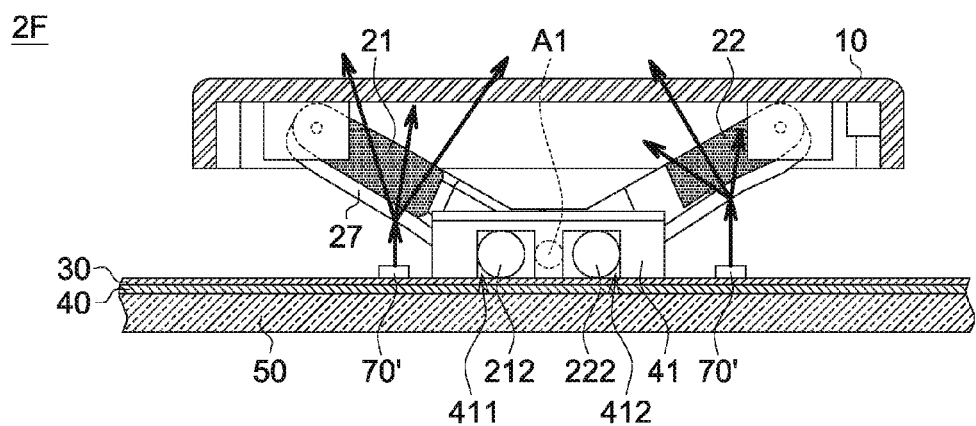

Refer to FIGS. 16-1 and 16-2, cross-sectional views of a key structure 2F according to an embodiment of the invention are shown. The key structure 2F further includes a light guide layer 27 disposed on the first hinge part 21 and/or the second hinge part 22. The key cap 10, the first hinge part 21 and the second hinge part 22 can be permeable to the light. After the light guide layer 27 receives a light emitted from the backlight module 70 or 70', the received light is uniformly radiated towards the key cap 10 to illuminate the key cap 10. Refer to FIG. 16-1. In an embodiment, the backlight module 70, such as an organic light-emitting diode, is located under the light guide layer 27. Refer to FIG. 16-2. In an embodiment, the backlight module 70', such as a light-emitting diode, is located under the light guide layer 27.

As indicated in FIG. 15, when the key cap 10 is pressed, the axis A1 as the rotation center of the bridge assembly is moved upward such that the first pivot coupling portion 212 and the second pivot coupling portion 222 are moved towards the inner sides of two first pivot holes 411 and 412 of the first hinge part 41 and contact the inner-walls of the two first pivot holes 411 and 412. When the key cap 10 is released (not illustrated in FIG. 15), the axis A1 as the rotation center is moved downward, such that the first pivot coupling portion 212 and the second pivot coupling portion 222 respectively move towards the outer sides of two first pivot holes 411 and 412 of the first hinge part 41 and contact the outer-walls of the two first pivot holes 411 and 412. Similarly, as indicated in FIGS. 16-1 and 16-2, when the key cap 10 is released, the axis A1 as the rotation center is moved downward, so that the first pivot coupling portion 212 and the second pivot coupling portion 222 are moved towards the outer sides of the two first pivot holes 411 and 412 of the first hinge part 41 and contact the outer-walls of the two first pivot holes 411 and 412.

In an embodiment, the light guide layer 27 of FIGS. 16-1 and 16-2 can be a fluorescent coating layer, which can be coated on the first hinge part 21 and/or the second hinge part 22 which is permeable to the light. In another embodiment, the light guide layer 27 of FIGS. 16-1 and 16-2 can be a micro-structure layer which uniformly radiates the light towards the key cap 10 by way of refraction or scattering to illuminate the key cap 10. Besides. In another embodiment, the light guide layer 27 of FIGS. 16-1 and 16-2 can be a light diffuser layer, a light condenser layer or a film capable of radiating the light towards the key cap 10 by way of scattering or condensing to illuminate the key cap 10.

While the invention has been described by way of example and in terms of the preferred embodiment(s), it is to the underneath of stood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A key structure, comprising:
a key cap;
a bridge assembly disposed under the key cap, wherein the bridge assembly comprises:
a first hinge part, wherein one end of the first hinge part has a first link bar, the other end of the first hinge part has a first pivot coupling portion and a first shaft, and the first shaft has a first connecting portion; and a second hinge part, wherein one end of the second hinge part has a second link bar, the other end of the second hinge part has a second pivot coupling portion and a second shaft, and the second shaft has a second connecting portion;

a first supporting part and a second supporting part coupled to two ends of the first pivot coupling portion and two ends of the second pivot coupling portion, respectively;

an attractable element disposed under the bridge assembly, wherein the attractable element has a first end and a second end, the first end and the second end are rotated around an axis and correspondingly to a first attractive position and a second attractive position; and a magnet providing a magnetic force and being movable between the underneath of the first and second attractive positions, wherein when the magnet is under the first attractive position, the first end of the attractable element is attracted by the magnetic force and moved to the first attractive position; when the magnet is under the second attractive position, the second end of the attractable element is attracted by the magnetic force and moved to the second attractive position.

2. The key structure according to claim 1, wherein the first hinge part or the second hinge part has a stopping portion correspondingly located above the second attractive position, and when the magnet is moved to the underneath of the second attractive position to attract the second end of the attractable element, the stopping portion contacts the magnet on the second attractive position.

3. The key structure according to claim 1, further comprising a supporting board for fixing the first supporting part and the second supporting part, the first and second supporting parts are disposed oppositely and erected on a supporting side of the supporting board, the first supporting part comprises two first pivot holes, the second supporting part comprises two second pivot holes, and the two first pivot holes are opposite to the two second pivot holes for receiving the two ends of the first pivot coupling portion and the two ends of the second pivot coupling portion, respectively.

4. The key structure according to claim 3, further comprising a base board, wherein the base board is disposed under the supporting board, and the base board or the supporting board is a sliding board, so that the base board and the supporting board slide with respect to each other.

5. The key structure according to claim 4, wherein the base board has a receiving space for receiving the magnet, the supporting board has a first opening, the first opening and the receiving space are correspondingly under the attractable element, the size of the first opening is larger than the size of the receiving space, the first opening provides an operation space allowing the magnet to be moved to the underneath of the second attractive position from the underneath of the first attractive position, and the receiving space is for fixing the magnet on the base board.

6. The key structure according to claim 5, wherein the receiving space is formed of a second opening passing through the base board or a recess not passing through the base board.

7. The key structure according to claim 4, wherein the base board comprises at least one stopping part which is moved to a stopping position of the key cap, and when the magnet is moved to the underneath of the second attractive position to attract the second end of the attractable element, the stopping part contacts the key cap, so that the key cap remains at the stopping position.

8. The key structure according to claim 5, wherein a height of the magnet is over an upper surface of the supporting board, and when the supporting board and the base board slide with respect to each other, the magnet is moved from one side to the other side of the first opening, and the edge of the first opening of the supporting board contacts the magnet to limit the scope of movement of the base board.

9. The key structure according to claim 5, wherein the base board is disposed above a lower casing and has a third opening, the lower casing has a positioning part disposed in the third opening, and when the base board slides with respect to the lower casing, the positioning part is moved from one side to the other side of the third opening and contacts the edge of the third opening to limit the scope of movement of the base board.

10. The key structure according to claim 1, wherein the first shaft and the second shaft are connected on the axis, so that the first hinge part and the second hinge part are rotated around the axis.

11. The key structure according to claim 10, wherein the first connecting portion and the second connecting portion comprise a protrusion portion and an indention portion coupled to each other on the axis.

12. The key structure according to claim 1, wherein the key cap comprises a plurality of link bar supporting portions for linking the first link bar of the first hinge part and the second link bar of the second hinge part respectively.

13. The key structure according to claim 1, wherein at least one of a part of the first hinge part near the first link bar and a part of the second hinge part near the second link bar has an actuation portion correspondingly located above a touch portion.

14. The key structure according to claim 13, further comprising a thin film circuit board having a switch element disposed under the touch portion, wherein when the touch portion contacts the actuation portion, the switch element is activated to generate a key pressing signal.

15. A portable computer, comprising an upper cover, a lower cover and a connecting part connecting the upper cover to the lower cover, wherein the upper cover drives the base board or the supporting board of the key structure according to claim 4 to change the key structure to a storing status or a releasing status when the upper cover is rotated.

16. The portable computer according to claim 15, wherein the connecting part is a hinge coupled to the base board or the supporting board through a connecting assembly which further comprises a moving part coupled between the hinge and the base board or between the hinge and the supporting board, the hinge has first teeth, the moving part has second teeth, and the first teeth and the second teeth are engaged with each other.

17. The portable computer according to claim 16, wherein the moving part is formed of a part of the base board or the supporting board extended to the underneath of the hinge.

18. The portable computer according to claim 15, wherein the connecting part is a hinge coupled to the base board or the supporting board through a connecting assembly which further comprises a guide screw parallel to the axial direction of the hinge and coupled to the base board or the supporting board, and the surface of the base board or the supporting board has a screw thread or a screw kit engaged with the screw thread of the guide screw.

19. The portable computer according to claim 18, wherein the connecting assembly further comprises a first gear and a second gear, the first gear is coaxial with the hinge or is integrally formed in one piece with the hinge, the second gear is coaxial with the guide screw or is integrally formed in one piece with the guide screw, and the first gear and the second gear are engaged with each other.

20. The portable computer according to claim 18, wherein the guide screw is coaxial with the hinge or is integrally formed in one piece with the hinge.

21. The portable computer according to claim 15, wherein the connecting part is a hinge coupled to the base board or the supporting board through a connecting assembly which further comprises a guide screw, a first bevel gear and a second bevel gear, the guide screw is perpendicular to the axial direction of the hinge and coupled to the base board or the supporting board, the first bevel gear is coaxial with the hinge or is integrally formed in one piece with the hinge, the second bevel gear is coaxial with the guide screw or is integrally formed in one piece with the guide screw, and the first bevel gear and the second bevel gear are engaged with each other.

22. The portable computer according to claim 15, wherein the connecting part is a hinge coupled to the base board or the supporting board through a connecting assembly which further comprises a cam pillar and at least one guide member, the cam pillar has a recess, one end of the at least one guide member moves along an axial direction of the cam pillar inside the recess, and the other end of the guide member is coupled to the base board or the supporting board.

23. The portable computer according to claim 21, wherein the recess is 8-shaped and surrounds the cam pillar in a cycle, and one end of the guide member is moved to a second terminal position of the recess from a first terminal position of the recess.

24. The portable computer according to claim 15, further comprising a backlight module disposed above the supporting board, between the supporting board and the base board, or under the base board.

25. The portable computer according to claim 15, further comprising a lubricating layer disposed between the supporting board and the base board.

26. The portable computer according to claim 15, further comprising a plurality of rollers disposed between the supporting board and the base board.

27. The portable computer according to claim 15, further comprising a light guide layer disposed on at least one of the first hinge part and the second hinge part.

* * * * *